United States Patent
Ushioda et al.

(10) Patent No.: US 6,303,696 B1
(45) Date of Patent: *Oct. 16, 2001

(54) PROPYLENE (CO)POLYMER COMPOSITION USING METALLOCENE CATALYST

(75) Inventors: Tsutomu Ushioda; Jun Saito; Mototake Tsutsui; Shingo Kikukawa; Akira Yamauchi, all of Chiba (JP)

(73) Assignee: Chisso Corporation, Osaka (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/044,708

(22) Filed: Mar. 19, 1998

(30) Foreign Application Priority Data

Apr. 11, 1997 (JP) .................................................. 9-094198

(51) Int. Cl.$^7$ .............................. C08F 4/642; C08L 23/02; C08L 23/10; C08L 53/00

(52) U.S. Cl. .......................... 525/240; 526/351; 526/943

(58) Field of Search ........................... 525/240; 526/351, 526/943

(56) References Cited

U.S. PATENT DOCUMENTS

| | | |
|---|---|---|
| 3,808,206 | 4/1974 | Fleming et al. . |
| 4,460,757 | 7/1984 | Sato et al. . |
| 4,634,740 | 1/1987 | Fujita et al. . |
| 4,923,935 | 5/1990 | Sano et al. . |
| 5,047,485 | 9/1991 | DeNicola, Jr. . |
| 5,155,080 | 10/1992 | Elder et al. . |
| 5,252,529 | * 10/1993 | Ueda et al. ............................. 502/113 |
| 5,260,384 | * 11/1993 | Morimoto et al. .................... 525/240 |
| 5,382,631 | * 1/1995 | Stehling et al. ....................... 525/240 |
| 5,387,568 | 2/1995 | Ewen et al. . |
| 5,468,440 | * 11/1995 | McAlpin et al. ...................... 264/291 |
| 5,494,982 | * 2/1996 | Nakacho et al. ........................ 526/65 |
| 5,519,100 | 5/1996 | Ewen et al. . |
| 5,539,067 | 7/1996 | Parodi et al. . |
| 5,561,092 | 10/1996 | Ewen et al. . |
| 5,614,457 | 3/1997 | Ewen et al. . |
| 5,629,254 | 5/1997 | Fukuoka et al. . |
| 5,663,249 | 9/1997 | Ewen et al. . |
| 5,854,354 | 12/1998 | Ueda et al. . |
| 6,004,897 | 12/1999 | Imuta et al. . |
| 6,057,408 | * 5/2000 | Winter et al. ......................... 526/160 |
| 6,153,710 | * 11/2000 | Saito et al. ............................. 526/75 |
| 6,156,845 | * 12/2000 | Saito et al. ............................ 525/240 |

FOREIGN PATENT DOCUMENTS

| | | |
|---|---|---|
| 32 46 447 | 7/1983 | (DE) . |
| 0 315 481 A3 | 5/1989 | (EP) . |
| 0 398 350 | 11/1990 | (EP) . |
| 0 534 119 | 3/1993 | (EP) . |
| 0 536 503 | 4/1993 | (EP) . |
| 0 538 749 | 4/1993 | (EP) . |
| 0 577 321 A1 | 1/1994 | (EP) . |
| 0 579 510 | 1/1994 | (EP) . |
| 0 580 033 | 1/1994 | (EP) . |
| 0 611 780 A2 | 8/1994 | (EP) . |
| 0 714 923 | 6/1996 | (EP) . |
| 0 856 526 A1 | 8/1998 | (EP) . |
| 0 864 589 A2 | 9/1998 | (EP) . |
| 1 483 960 | 8/1977 | (GB) . |
| 52-136247 | 11/1977 | (JP) . |
| 53-91954 | 8/1978 | (JP) . |
| 55-123637 | 9/1980 | (JP) . |
| 56-3356 | 1/1981 | (JP) . |
| 56-110707 | 9/1981 | (JP) . |
| 57-31945 | 2/1982 | (JP) . |
| 57-63310 | 4/1982 | (JP) . |
| 57-63311 | 4/1982 | (JP) . |
| 57-65738 | 4/1982 | (JP) . |
| 57-151602 | 9/1982 | (JP) . |
| 58-17104 | 2/1983 | (JP) . |
| 58-83006 | 5/1983 | (JP) . |
| 58-138712 | 8/1983 | (JP) . |
| 58-225143 | 12/1983 | (JP) . |
| 59-93711 | 5/1984 | (JP) . |

(List continued on next page.)

OTHER PUBLICATIONS

Kaminsky, "Metallocene Catalysts", SP'92–Polyethylene World Congress, Zurich Switzerland, Dec. 7–9, 1992.*

A. Zambelli, et al., Model Compounds and C NMR Observation of Stereosequences of Polypropylene, pp. 687–689, Macromolecules vol. 8, No. 5, 1975.

A. Zambelli, et al., Carbon–13 Observations of the Stereochemical Configuration of Polypropylene, pp. 925–926, Macromolecules vol. 6, No. 6, 1973.

Takaya Mise et al., "Excellent Stereoregular Isotactic Polymerizations of Propylene with $C_2$–Symmetric Silylene–Bridged Metallocene Catalysts" *Chemistry Letters*, pp. 1853–1856, 1989.

Walter Spaleck et al., "The Influence of Aromatic Subsituents on the Polymerization Behavior of Bridged Zirconocene Catalysts" *Organometallics*, vol. 13, No. 3 (American Chemical Society), pp. 954–963, 1994.

*Primary Examiner*—Donald R. Wilson
(74) *Attorney, Agent, or Firm*—Merchant & Gould P.C.

(57) ABSTRACT

The present invention provides a polypropylene composition having a high melt tension and an excellent formability by blending polypropylene (I) produced with a metallocene catalyst type and an olefin (co)polymer (II) comprising 0.01 to 5 parts by weight of the following component (II-1) and 100 parts by weight of the following component (II-2); (II-1): an ethylene homopolymer or an ethylene-olefin copolymer comprising at least 50 wt % ethylene polymerization units, which is a high molecular weight polyethylene having an intrinsic viscosity $[\eta_E]$ measured in tetralin at 135° C. of 15 to 100 dl/g; and (II-2): polypropylene.

12 Claims, 1 Drawing Sheet

FOREIGN PATENT DOCUMENTS

| | | |
|---|---|---|
| 60-81211 | 5/1985 | (JP) . |
| 60-139710 | 7/1985 | (JP) . |
| 61-64704 | 4/1986 | (JP) . |
| 61-130310 | 6/1986 | (JP) . |
| 61-151204 | 7/1986 | (JP) . |
| 61-152754 | 7/1986 | (JP) . |
| 62-1738 | 1/1987 | (JP) . |
| 62-25106 | 2/1987 | (JP) . |
| 62-104810 | 5/1987 | (JP) . |
| 62-104811 | 5/1987 | (JP) . |
| 62-104812 | 5/1987 | (JP) . |
| 63-12606 | 1/1988 | (JP) . |
| 1-156305 | 6/1989 | (JP) . |
| 2-135243 | 5/1990 | (JP) . |
| 2-298536 | 12/1990 | (JP) . |
| 2-305811 | 12/1990 | (JP) . |
| 3-12406 | 1/1991 | (JP) . |
| 3-12407 | 1/1991 | (JP) . |
| 3-50239 | 3/1991 | (JP) . |
| 3-220208 | 9/1991 | (JP) . |
| 4-55410 | 2/1992 | (JP) . |
| 5-65373 | 3/1993 | (JP) . |
| 5-140224 | 6/1993 | (JP) . |
| 5-222122 | 8/1993 | (JP) . |
| 5-239232 | 9/1993 | (JP) . |
| 5-255436 | 10/1993 | (JP) . |
| 5-255437 | 10/1993 | (JP) . |
| 6-184371 | 7/1994 | (JP) . |
| 6-206923 | 7/1994 | (JP) . |
| 6-206939 | 7/1994 | (JP) . |
| 6-234812 | 8/1994 | (JP) . |
| 7-188317 | 7/1995 | (JP) . |
| 7-188336 | 7/1995 | (JP) . |
| 7-238114 | 9/1995 | (JP) . |
| 8-217816 | 8/1996 | (JP) . |
| 8-217889 | 8/1996 | (JP) . |
| 10-17736 | 1/1998 | (JP) . |
| WO 88/05792 | 8/1988 | (WO) . |
| WO 88/05793 | 8/1988 | (WO) . |
| WO 94/28034 | 12/1994 | (WO) . |

* cited by examiner

FIG. 1

PROPYLENE (CO)POLYMER COMPOSITION USING METALLOCENE CATALYST

BACKGROUND OF THE INVENTION

1. Field of the Invention

The present invention relates to an olefin (co)polymer composition. More specifically, the present invention relates to an olefin (co)polymer composition having high melt tension and excellent formability.

2. Description of the Prior Art

Olefin (co)polymers such as polypropylene and polyethylene or the like are widely used in a variety of molding fields because of excellent mechanical properties, chemical resistance and cost-effectiveness. Conventionally, the olefin (co)polymers have been generally produced by (co) polymerizing olefin by using a Ziegler-Natta catalyst, which is obtained by combining a transition metal catalyst composition such as titanium trichloride or titanium tetrachloride, or titanium trichloride or titanium tetrachloride supported on magnesium chloride, and an organic aluminum compound.

In recent years, on the other hand, a catalyst that is obtained by combining metallocene and aluminoxane, which is different from catalysts in the prior art, is used to (co)polymerize olefins to obtain olefin (co)polymers. The olefin (co)polymer obtained by using the metallocene-based catalyst has a narrow molecular weight distribution, and in the case of copolymers, comonomers are copolymerized uniformly. Therefore, it is known that more homogeneous olefin (co)polymers can be obtained. However, compared with olefin (co)polymers obtained by using a conventional catalyst, the olefin (co)polymers obtained by using the metallocene-based catalyst have a lower melt tension, so that they are not suitable for some uses.

In order to enhance the melt tension and the crystallization temperature, the following methods were proposed: a method of reacting polypropylene with an organic peroxide and a crosslinking assistant in a molten state (disclosed in Publication of Japanese Patent Application (Tokkai-Sho) Nos. 59-93711, 61-152754 or the like); and a method of reacting semi-crystalline polypropylene with a peroxide having a low degradation temperature in the absence of oxygen so as to produce polypropylene having free-end long branches and containing no gel (disclosed in Publication of Japanese Patent Application (Tokkai-Hei) No.2-298536).

Other methods for enhancing melting viscoelastic properties such as melt tension were proposed, such as a method of using a composition comprising polyethylenes or polypropylenes having different intrinsic viscosities or molecular weights, or producing such compositions by multistage polymerization.

Examples of such a method include a method in which 2 to 30 parts by 10 weight of ultra high molecular weight polypropylene are added to 100 parts by weight of ordinary polypropylene and extrusion is performed in a temperature range from a melting point to 210° C. (disclosed in Japanese Patent Publication (Tokko-Sho) No. 61-28694), a method using multistage polymerization to obtain an extrusion sheet formed of two components of polypropylene having different molecular weights and an intrinsic viscosity ratio of at least 2 (disclosed in Japanese Patent Publication (Tokko-Hei) No. 1-12770), a method of producing a polyethylene composition formed of three types of polyethylene having different viscosity average molecular weights comprising 1 to 10 wt % of high viscosity average molecular weight polyethylene by melting and kneading or multistage polymerization (disclosed in Japanese Patent Publication (Tokko-Sho) No. 62-61057), a method for polymerizing polyethylene in which 0.05 to 1 wt % or less of ultra high molecular weight polyethylene having an intrinsic viscosity of 20 dl/g or more is polymerized by multistage polymerization (disclosed in Japanese Patent Publication (Tokko-Hei) No. 5-79683), a method for polymerizing polyethylene in which 0.1 to 5 wt % of ultra high molecular weight polyethylene having an intrinsic viscosity of 15 dl/g or more is polymerized by multistage polymerization in a polymerization reactor having a special arrangement by using a highly active titanium catalyst composition preliminarily polymerized with 1-butene or 4-methyl-1-pentene (disclosed in Japanese Patent Publication (Tokko-Hei) No.7-8890) or the like.

Furthermore, Japanese Patent Application Publication (Tokkai-Hei) No. 5-222122 disclosed a method for producing polypropylene having a high melt tension by polymerizing polypropylene by using a preliminarily polymerized catalyst obtained by preliminarily polymerizing compounds of ethylene and polyene with a supported Ti solid catalyst composition and an organic aluminum compound catalyst composition. Japanese Patent Application Publication (Tokkai-Hei) No. 4-55410 disclosed a method for producing linear low density polyethylene (LLDPE) having a high melt tension by using a preliminarily polymerized catalyst containing polyethylene having an intrinsic viscosity of 20dl/g or more obtained by preliminarily polymerizing ethylene alone with the same catalyst compositions as above.

Furthermore, the following methods were proposed in order to enhance a melt tension in the case where a metallocene catalyst type is used: a method of using a catalyst comprising a silica support containing at least 1.0 wt % of water, metallocene, methylaluminoxane and triisobutyl aluminum (as disclosed in Japanese Patent Application Publication (Tokkai-Hei) No.5-140224); a method of using two types of metallocene as catalyst components (as disclosed in Japanese Patent Application Publication (Tokkai-Hei) Nos. 5-255436, 5-255437 and 6-206939); and a method of using montmorillonite as a metallocene catalyst type (as disclosed in Japanese Patent Application Publication (Tokkai-Hei) Nos. 7-188317 and 7-188336).

In the above-mentioned various compositions and the production methods in connection with the catalyst types in the prior art, the melt tension of polyolefin is enhanced to some extent under measurement conditions at 190° C. However, other problems still remain unsolved with respect to the melt tension under use conditions at 200° C. or more, a residual odor caused by the crosslinking assistant, the crystallization temperature, the heat stability of properties other than the melt tension, or the like.

Furthermore, although the proposed methods in connection with the metallocene catalyst type provide an improvement of the melt tension of polyolefin under measurement conditions at 190° C., it is still desired to further improve the melt tension under use conditions at 200° C. or more.

SUMMARY OF THE INVENTION

Therefore, with the foregoing in mind, it is an object of the present invention to provide an olefin (co)polymer composition having a high melt tension and an excellent formability by using an olefin (co)polymer obtained by (co)polymerizing olefin with a metallocene type catalyst. In particular, it is an object of the present invention to improve the melt tension of the olefin (co)polymer obtained from metallocene and thus to improve the formability thereof. As a result of ardent research to achieve the objects, the Inventors discovered that an olefin (co)polymer composition having high melt tension and excellent formability can be obtained by blending a metallocene-based olefin (co) polymer with an olefin (co)polymer polymerized with a preliminarily activated catalyst in which a small amount of polypropylene for the main (co)polymerization and polyethylene having a specific intrinsic viscosity are supported by a polyolefin production catalyst.

An olefin (co)polymer composition of the present invention comprises 99 to 50% by weight of olefin (co)polymer (I) and 1 to 50% by weight of olefin composition (II). The olefin (co)polymer (I) has an intrinsic viscosity $[\eta_I]$ measured in tetralin at 135° C. of 0.2 to 10 dl/g and is obtained by (co)polymerizing olefin with a catalyst comprising the following compounds (A) and (B), or (A), (B) and (C): compound (A): a transition metal compound having at least one π electron conjugated ligand; compound (B) one or more compounds selected from the group consisting of: (B-1) aluminoxane, (B-2) an ionic compound that forms an ionic complex by a reaction with the transition metal compound (A), and (B-3) a Lewis acid; and compound (C): an organic aluminum compound. The olefin composition (II) comprises 0.01 to 5 parts by weight of the following component (II-1) and 100 parts by weight of the following component (II-2): (II-1): a high molecular weight olefin (co)polymer having an intrinsic viscosity $[\eta_E]$ measured in tetralin at 135° C. of 15 to 100 dl/g; and (II-2): olefin (co)polymers other than the high molecular weight olefin component (II-1).

In one embodiment of the present invention, the component (II-1) is an ethylene homopolymer or an ethylene-olefin copolymer comprising at least 50 wt % ethylene polymerization units.

In another embodiment of the present invention, the olefin (co)polymer (I) is a propylene homopolymer or a propylene-olefin random copolymer or a propylene-olefin block copolymer comprising at least 50 wt % propylene polymerization units.

In still another embodiment of the present invention, the olefin component (II-2) is a propylene homopolymer or a propylene-olefin random copolymer or a propylene-olefin block copolymer comprising at least 50 wt % propylene polymerization units.

In yet another embodiment of the present invention, the olefin (co)polymer composition has a melt tension (MS) at 230° C. and a melt flow rate (MFR) measured under a load of 21.18N at 230° C. that satisfy the following inequality:

$$\log(MS) > -1.28 \times \log(MFR) + 0.44$$

In another embodiment of the present invention, the compound (A) is a transition metal compound expressed by general formula [1]:

ML$p$ (general formula [1])

(where M is a transition metal selected from the group consisting of Zr, Ti, Hf, V, Nb, Ta and Cr, p is a valence of the transition metal, and L is a ligand coordinated with the transition metal, and at least one L is a π electron conjugated ligand.)

In still another embodiment of the present invention, the π electron conjugated ligand is a ligand having at least one structure selected from the group consisting of a η-cyclopentadienyl structure, a η-benzene structure, a η-cycloheptatrienyl structure, or a η-cyclooctatetraene structure.

In yet another embodiment of the present invention, the ligand having a η-cyclopentadienyl structure is at least one ligand selected from the group consisting of a cyclopentadienyl group, an indenyl group, an indenyl hydride group and a fluorenyl group (these groups may be substituted with a hydrocarbon group such as an alkyl group, an aryl group and an aralkyl group, a silicon-substituted hydrocarbon group such as a trialkylsilyl group, a halogen atom, an alkoxy group, an aryloxy group, a chain alkylene group, a cyclic alkylene group or the like).

In another embodiment of the present invention, in the case where the transition metal compound expressed by general formula [1] comprises two or more π electron conjugated ligands, two π electron conjugated ligand can be crosslinked through at least one group selected from the group consisting of an alkylene group, a substituted alkylene group, a cycloalkylene group, a substituted cycloalkylene group, a substituted alkylidene group, a phenylene group, a silylene group, a dimethylsilylene group and a diphenylsilylene group, a dialkylsilylene group, a substituted dimethylsilylene group and a germyl group (Me$_2$Ge).

In still another embodiment of the present invention, L other than the π electron conjugated ligand is at least one selected from the group consisting of a halogen, a hydrocarbon group such as an alkyl group, a cycloalkyl group, an aryl group, an aralkyl group, a silicon-substituted hydrocarbon group, an alkoxy group, an aryloxy group, and a substituted sulfonato group.

In yet another embodiment of the present invention, the olefin (co)polymer composition is produced by blending the above-described olefin (co)polymer (I) and composition (II) and an additional component, if desired, by using mechanically mixing equipment.

In another embodiment of the present invention, the mechanically mixing equipment is at least one apparatus selected from the group consisting of an extruder and a kneader.

These and other advantages of the present invention will become apparent to those skilled in the art upon reading and understanding the following detailed description with reference to the accompanying figure.

DESCRIPTION OF THE PREFERRED EMBODIMENTS

Figure 1:
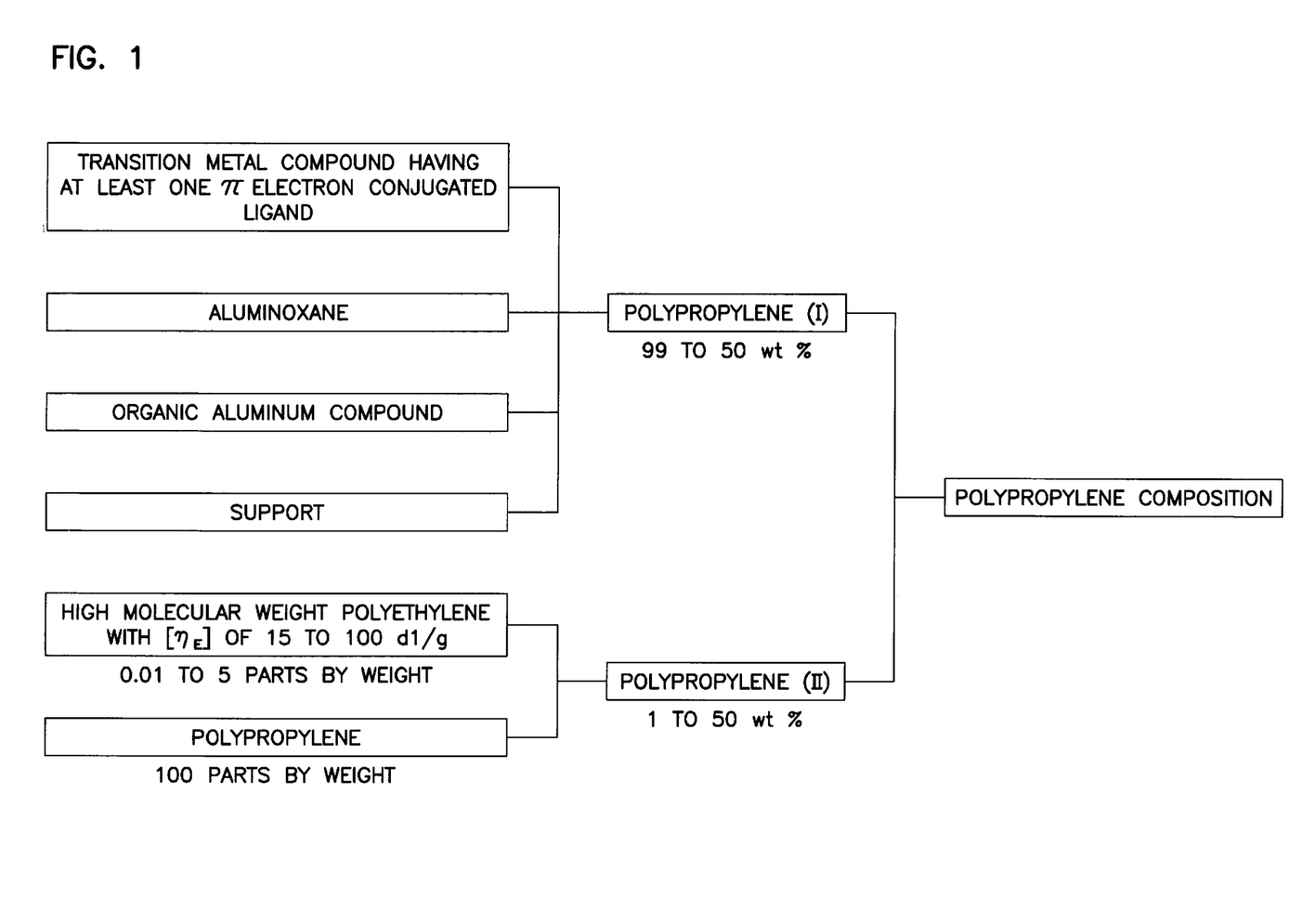
FIG. 1 is a flow sheet showing a method for producing a polypropylene composition of an example of the present invention.

The term "polypropylene" used in the specification of the present application refers to a propylene homopolymer, a propylene-olefin random copolymer and a propylene-olefin block copolymer comprising at least 50 wt % propylene polymerization units. The term "polyethylene" refers to an ethylene homopolymer and an ethylene-olefin random copolymer comprising at least 50 wt % ethylene polymerization units.

The olefin (co)polymer composition of the present invention comprises a composition comprising 99 to 50 wt % of an olefin (co)polymer (I) and 1 to 50 wt % of an olefin composition (II).

The olefin (co)polymer (I), a component of the olefin (co)polymer composition of the present invention, is an olefin (co)polymer having an intrinsic viscosity $[\eta_I]$ of 0.2 to 10 dl/g when measured in tetralin at 135° C. The olefin (co)polymer (I) is either a homopolymer or a copolymer of olefin having 2 to 12 carbon atoms, but preferably a propylene homopolymer, a propylene-olefin random copolymer or a propylene-olefin block copolymer comprising at least 50 wt % propylene polymerization units, more preferably a propylene homopolymer, a propylene-olefin random copolymer comprising at least 90 wt % propylene polymerization units or a propylene-olefin block copolymer comprising at least 70 wt % propylene polymerization units. These (co)polymers can be used alone or in combinations of two or more.

In view of the mechanical characteristics and the formability of the finally obtained olefin (co)polymer composition, an olefin (co)polymer having an intrinsic viscosity $[\eta_I]$ of 0.2 to 10 dl/g, preferably 0.5 to 8 dl/g, can be used for the olefin (co)polymer (I).

Furthermore, the olefin (co)polymer (I) of the present invention may be obtained by (co)polymerizing olefin with a catalyst comprising the following compounds (A) and (B) or (A), (B) and (C).

Compound (A): a transition metal compound having at least one π electron conjugated ligand;

Compound (B) one or more compounds selected from the group consisting of: (B-1) aluminoxane, (B-2) an ionic compound that reacts with the transition metal compound (A) so as to form an ionic complex, and (B-3) Lewis acid; and Compound (C): an organic aluminum compound.

The compound (A) is generally referred to as "metallocene", and more specifically, refers to a transition metal compound expressed by $$ML_p \qquad \text{general formula [1]}$$

where M is a transition metal selected from the group consisting of Zr, Ti, Hf, V, Nb, Ta and Cr, p is a valence of the transition metal, and L is a ligand coordinated with the transition metal, and at least one L is a π electron conjugated ligand.

Specific examples of the π electron conjugated ligand include a ligand having a η-cyclopentadienyl structure, a η-benzene structure, a η-cycloheptatrienyl structure, or a η-cyclooctatetraene structure, and a most preferable example is a ligand having a η-cyclopentadienyl structure.

Examples of the ligand having a η-cyclopentadienyl structure include a cyclopentadienyl group, an indenyl group, an indenyl hydride group, a fluorenyl group or the like. These groups may be substituted with a hydrocarbon group such as an alkyl group, an aryl group and an aralkyl group, a silicon-substituted hydrocarbon group such as a trialkylsilyl group, a halogen atom, an alkoxy group, an aryloxy group, a chain alkylene group, a cyclic alkylene group or the like.

Furthermore, in the case where the transition metal compound expressed by general formula [1] comprises two or more π electron conjugated ligands, two π electron conjugated ligands can be crosslinked through an alkylene group, a substituted alkylene group, a cycloalkylene group, a substituted cycloalkylene group, a substituted alkylidene group, a phenylene group, a silylene group, a dimethylsilylene group, a diphenylsilylene group, a dialkylsilylene group, a substituted dimethylsilylene group, a germyl group ($Me_2Ge$) or the like.

Examples of L other than the π electron conjugated ligand include a halogen, a hydrocarbon group such as an alkyl group, a cycloalkyl group, an aryl group, an aralkyl group, a silicon-substituted hydrocarbon group, an alkoxy group, an aryloxy group, a substituted sulfonato group. Moreover, a bivalent group such as an amidesilylene group and an amidealkylene group may be coupled to a the π electron conjugated ligand. Halogen, as listed above, refers to fluorine, chlorine, bromine, and iodine, and chlorine is preferably used.

Hereinafter, specific examples of metallocene, the compound (A) used in the present invention, will be described, but it is not limited thereto.

Examples of metallocene having one π electron conjugated ligand include (t-butylamide) (tetramethylcyclopentadienyl)-1,2-ethylene zirconium dimethyl, (t-butylamide) (tetramethylcyclopentadienyl)-1,2-ethylene titanium dimethyl, (methylamide) (tetramethylcyclopentadienyl)-1,2-ethylene zirconium dibenzil, (methylamide) (tetramethylcyclopentadienyl)-1,2-ethylene titanium dimethyl, (ethylamide) (tetramethylcyclopentadienyl)methylene titanium dimethyl, (t-butylamide)dibenzil(tetramethylcyclopentadienyl) silylene zirconium dibenzil, (benzilamide)dimethyl (tetramethylcyclopentadienyl)silylene titanium diphenyl, (phenyl phosphido)dimethyl(tetramethylcyclopentadienyl) silylenezirconium dibenzil or the like.

Examples of metallocene having two π electron conjugated ligands that are not crosslinked, in the case where the transition metal is zirconium, include bis(cyclopentadienyl) zirconium dichloride, bis(cyclopentadienyl)zirconium dimethyl, bis(cyclopentadienyl)zirconium methylchloride, (cyclopentadienyl) (methylcyclopentadienyl)zirconium dichloride, (cyclopentadienyl) (methylcyclopentadienyl) zirconium dimethyl, (cyclopentadienyl) (ethylcyclopentadienyl)zirconium dichloride, (cyclopentadienyl) (ethylcyclopentadienyl)zirconium dimethyl, (cyclopentadienyl) (dimethylcyclopentadienyl) zirconium dichloride, (cyclopentadienyl) (dimethylcyclopentadienyl)zirconium dimethyl, bis (methylcyclopentadienyl)zirconium dichloride, bis (methylcyclopentadienyl)zirconium dimethyl, bis (ethylcyclopentadienyl)zirconium dichloride, bis (ethylcyclopentadienyl)zirconium dimethyl, bis (propylcyclopentadienyl)zirconium dichloride, bis (propylcyclopentadienyl)zirconium dimethyl, bis (butylcyclopentadienyl)zirconium dichloride, bis (butylcyclopentadienyl)zirconium dimethyl, bis (dimethylcyclopentadienyl)zirconium dichloride, bis (dimethylcyclopentadienyl)zirconium dimethyl, bis (diethylcyclopentadienyl)zirconium dichloride, bis (diethylcyclopentadienyl)zirconium dimethyl, bis (methylethylcyclopentadienyl)zirconium dichloride, bis (methylethylcyclopentadienyl)zirconium dimethyl, bis (trimethylcyclopentadienyl)zirconium dichloride, bis (trimethylcyclopentadienyl)zirconium dimethyl, bis (triethylcyclopentadienyl)zirconium dichloride, bis (triethylcyclopentadienyl)zirconium dimethyl or the like. In addition, compounds comprising titanium, hafnium, vanadium, niobium, tantalum or chromium substituted for zirconium in these zirconium compounds can be used.

In the illustrative examples as described above, a compound with a cyclopentadienyl ring substituted at two positions includes 1,2- and 1,3-substituted compounds, and a compound with a cyclopentadienyl ring substituted at three positions includes 1,2,3- and 1,2,4-substituted compounds. Furthermore, an alkyl group such as propyl, butyl or the like includes isomers such as n-, i-, sec-, tert-, or the like.

Examples of metallocene having two π electron conjugated ligands that are crosslinked include dimethylsilylene (3-t-butylcyclopendadienyl) (fluorenyl)zirconium dichloride, dimethylsilylene (3-t-butylcyclopendadienyl) (fluorenyl)hafnium dichloride, rac-ethylene bis(indenyl) zirconium dimethyl, rac-ethylene bis(indenyl)zirconium dichloride, rac-dimethylsilylene bis(indenyl)zirconium dimethyl, rac-dimethylsilylene bis(indenyl)zirconium dichloride, rac-ethylene bis(tetrahydroindenyl)zirconium dimethyl, rac-ethylene bis(tetrahydroindenyl)zirconium dichloride, rac-dimethylsilylene bis(tetrahydroindenyl) zirconium dimethyl, rac-dimethylsilylene bis (tetrahydroindenyl)zirconium dichloride, rac-dimethylsilylene bis(2-methyl-4,5,6,7-tetrahydroindenyl) zirconium dichloride, rac-dimethylsilylene bis(2-methyl-4,5,6,7-tetrahydroindenyl)zirconium dimethyl, rac-ethylene bis(2-methyl-4,5,6,7tetrahydroindenyl)hafnium dichloride, rac-dimethylsilylene bis(2-methyl-4-phenylindenyl) zirconium dichloride, rac-dimethylsilylene bis(2-methyl-4-phenylindenyl)zirconium dimethyl, rac-dimethylsilylene bis (2-methyl-4-phenylindenyl)hafnium dichloride, rac-dimethylsilylene bis(2-methyl-4-naphthylindenyl) zirconium dichloride, rac-dimethylsilylene bis(2-methyl-4-naphthylindenyl)zirconium dimethyl, rac-dimethylsilylene bis(2-methyl-4-naphthylindenyl)hafnium dichloride, rac-dimethylsilylene bis(2-methyl-4,5-benzoindenyl)zirconium dichloride, rac-dimethylsilylene bis(2-methyl-4,5-benzoindenyl)zirconium dimethyl, rac-dimethylsilylene bis (2-methyl-4,5-benzoindenyl)hafnium dichloride, rac-dimethylsilylene bis(2-ethyl-4-phenylindenyl)zirconium dichloride, rac-dimethylsilylene bis(2-ethyl-4-phenylindenyl)zirconium dimethyl, rac-dimethylsilylene bis (2-ethyl-4-phenylindenyl)hafnium dichloride, rac-dimethylsilylene bis(2-methyl-4,6-diisopropylindenyl) zirconium dichloride, rac-dimethylsilylene bis(2-methyl-4,6-diisopropylindenyl)zirconium dimethyl, rac-dimethylsilylene bis(2-methyl-4,6-diisopropylindenyl) hafnium dichloride, dimethylsilylene (2,4-dimethylcyclopentadienyl) (3',5'-dimethylcyclopentadienyl) titanium dichloride, dimethylsilylene (2,4-dimethylcyclopentadienyl) (3',5'-dimethylcyclopentadienyl) zirconium dichloride, dimethylsilylene (2,4-dimethylcyclopentadienyl) (3',5'-dimethylcyclopentadienyl) zirconium dimethyl, dimethylsilylene (2,4-dimethylcyclopentadienyl) (3',5'-dimethylcyclopentadienyl) hafnium dichloride, dimethylsilylene (2,4-dimethylcyclopentadienyl) (3',5'-dimethylcyclopentadienyl) hafnium dimethyl, dimethylsilylene (2,3,5-trimethylcyclopentadienyl) (2',4',5'-trimethylcyclopentadienyl)titanium dichloride, dimethylsilylene (2,3,5-trimethylcyclopentadienyl) (2',4',5'-trimethylcyclopentadienyl)zirconium dichloride, dimethylsilylene (2,3,5-trimethylcyclopentadienyl) (2',4',5'-trimethylcyclopentadienyl)zirconium dimethyl, dimethylsilylene (2,3,5-trimethylcyclopentadienyl) (2',4', 5'-trimethylcyclopentadienyl)hafnium dichloride, dimethylsilylene (2,3,5-trimethylcyclopentadienyl) (2',4',5'-trimethylcyclopentadienyl)hafnium dimethyl, or the like.

The compound (A) can be combined with the compound (B) or the compounds (B) and (C) as it is, so as to prepare a catalyst. Alternatively, the compound (A) supported by a fine particle support can be used. As the fine particle support, an inorganic or organic compound in the form of a granular or spherical fine particle solid having a particle diameter of 5 to 300 μm, preferably 10 to 200 μm can be used.

Examples of the inorganic compound used as the support include $SiO_2$, $Al_2O_3$, MgO, $TiO_2$, ZnO or the like, or the mixture thereof such as $SiO_2$—$Al_2O_3$, $SiO_2$—MgO, $SiO_2$—$TiO_2$, $SiO_2$—$A_2O_3$—MgO or the like. Among these, a compound that comprises $SiO_2$ or $Al_2O_3$ is preferably used.

Furthermore, examples of the organic compound used as the support include an α-olefin polymer or copolymer having 2 to 12 carbon atoms such as ethylene, propylene, 1-butene, 4-methyl-1-pentene or the like, or a polymer or a copolymer of styrene or styrene derivatives.

The compound (B) to be combined with the compound (A) metallocene, which is a component for a catalyst used in producing the olefin (co)polymer (I) used in the composition of the present invention, is a compound of at least one selected from aluminoxane (B-1), an ionic compound that reacts with the transition metal compound (A) so as to form an ionic complex (B-2) and Lewis acids (B-3).

Aluminoxane (B-1) refers to an organic aluminum compound expressed by chemical formulae 1 or 2.

(chemical formula 1)

(chemical formula 2)

where $R^3$ is a hydrocarbon group having 1 to 6 carbon atoms, preferably 1 to 4 carbon atoms, more specifically, an alkyl group such as a methyl group, an ethyl group, a propyl group, a butyl group, an isobutyl group, a pentyl group, a hexyl group or the like, an alkenyl group such as an allyl group, a 2-methylallyl group, a propenyl group, an isopropenyl group, a 2-methyl-1-propenyl group, a butenyl group or the like, a cycloalkyl group such as a cyclopropyl group, a cyclobutyl group, a cyclopentyl group, a cyclohexyl group or the like, and an aryl group or the like. Among these, an alkyl group is most preferable, and $R^3$ may be either the same or different.

Furthermore, q is an integer of 4 to 30, preferably 6 to 30, and most preferably 8 to 30.

The aluminoxane can be prepared under a variety of conditions. Specific examples thereof are as follows:

(1) By reacting trialkyl aluminum directly with water by using an organic solvent such as toluene, ether or the like;
(2) By reacting trialkyl aluminum with salts having crystal water, e.g., a copper sulfate hydrate, an aluminum sulfate hydrate;
(3) By reacting trialkyl aluminum with water impregnated in silica gel or the like;
(4) By mixing trimethyl aluminum and triisobutyl aluminum and reacting the mixture directly with water by using an organic solvent such as toluene, ether or the like;
(5) By mixing trimethyl aluminum and triisobutyl aluminum and reacting the mixture with salts having crystal water, e.g., a copper sulfate hydrate, an aluminum sulfate hydrate; and
(6) By impregnating silica gel with water and reacting it with triisobutyl aluminum and then trimethyl aluminum.

Furthermore, as for the ionic compound (B-2) that reacts with the transition metal compound (A) so as to form an ionic complex (hereinafter also referred to as "a compound (B-2)") and Lewis acids (B-3), the ionic compounds and Lewis acids that are described in Japanese Patent National Publication Nos. 1-501950 and 1-502036, Japanese Patent Application Publication Nos. 3-179005, 3-179006, 3-207703, 3-207704 or the like can be used.

The ionic compound (B-2) that is usable in the present invention is a salt of a cationic compound and an anionic compound. The anion has a function of cationizing the transition metal compound (A) by reacting with the transition metal compound (A), so as to form an ion pair, so that transition metal cation species can be stabilized. Examples of such anion include organic boron compound anion, organic aluminum compound anion, or the like. Furthermore, examples of the cation include metal cation, organic metal cation, carbonium cation, trityl cation, oxonium cation, sulfonium cation, phosphonium cation, ammonium cation or the like.

Among these, an ionic compound comprising a boron atom as the anion is preferable, and specific examples thereof include tetrakis(pentafluorophenyl) triethylammonium borate, tetrakis(pentafluorophenyl)tri-n-butylammonium borate, tetrakis(pentafluorophenyl) triphenylammonium borate, tetrakis (pentafluorophenyl) methylanilinium borate, tetrakis (pentafluorophenyl) dimethylanilinium borate, tetrakis (pentafluorophenyl) trimethylanilinium borate, or the like.

Furthermore, as the Lewis acid (B-3), a Lewis acid containing a boron atom is preferable, and the compounds expressed by chemical formula 3 below can be used.

(chemical formula 3)

(where $R^4$, $R^5$, and $R^6$ represent a phenyl group or a fluorine atom which may have a substituent such as a fluorine atom, a methyl group, trifluorophenyl group or the like, independently.)

Specific examples of the compound expressed by chemical formula 3 include tri(n-butyl)boron, triphenyl boron, tris[3,5-bis(trifluoromethyl)phenyl]boron, tris[(4-fluoromethyl)phenyl]boron, tris(3,5-difluorophenyl)boron, tris(2,4,6-trifluorophenyl)boron, tris(pentafluorophenyl) boron or the like. Among these, tris(pentafluorophenyl) boron is most preferable.

The transition metal compound (A) and the compound (B) are preferably used in the following ratio. In the case where aluminoxane (B-1) is used as the compound (B), the aluminum atom in the aluminoxane (B-1) is preferably in the range from 1 to 50,000 mols, preferably 10 to 30,000 mols, and most preferably 50 to 20,000 mols, per mol of the transition metal atom in the transition metal compound (A).

In the case where the compound (B-2) or Lewis acid (B-3) is used as the compound (B), the compound (B-2) or the Lewis acid (B-3) is preferably used in the range from 0.01 to 2,000 mols, preferably 0.1 to 500 mols, per mol of the transition metal atom in the transition metal compound (A).

It is possible to use one or more compounds as the compounds (B).

Furthermore, as for the organic aluminum compound, which is the compound (C) used as a component of the polymerization catalyst according to the present invention, a compound expressed by chemical formula 4 can be used.

(chemical formula 4)

(where $R^7$ and $R^8$ represent a hydrocarbon group such as an alkyl group, a cycloalkyl group, an aryl group or an alkoxy group having 1 to 10 carbon atoms; X represents a halogen atom; and t and t' represent arbitrary numbers satisfying the inequality $0<t+t'\leq 3$.)

Specific examples of the compound expressed by chemical formula 4 include trialkyl aluminum such as trimethyl aluminum, triethyl aluminum, triisopropyl aluminum, triisobutyl aluminum, tri-n-butyl aluminum or the like, dialkyl aluminum halide such as dimethyl aluminum chloride, dimethyl aluminum bromide, diethyl aluminum chloride, diisopropyl aluminum chloride or the like, alkyl aluminum sesquihalide such as methyl aluminum sesquichloride, ethyl aluminum sesquichloride, ethyl aluminum sesquibromide, isopropyl aluminum sesquichloride or the like. It is possible to use one or more compounds.

The organic aluminum compound, the compound (C), is preferably used in such a ratio that the aluminum atom in the organic aluminum compound (C) is preferably in the range from 0 to 10,000 mols, preferably 0 to 5,000 mols, and most preferably 0 to 3,000 mols, per mol of the transition metal atom in the transition metal compound (A).

Thus, the compositions (A) and (B), or (A), (B) and (C) are combined so as to prepare a specific catalyst. An olefin (co)polymer (I) for use in a composition of the present invention can be obtained by (co)polymerizing olefin with the thus prepared catalyst. The olefin can be polymerized by a known olefin (co)polymerization process: for example, a slurry polymerization in which olefin is polymerized in an aliphatic hydrocarbon such as butane, pentane, hexane, heptane, isooctane or the like, an alicyclic hydrocarbon such as cyclopentane, cyclohexane, methylcyclohexane or the like, an aromatic hydrocarbon such as toluene, xylene, ethylbenzene or the like, or an inactive solvent such as gasoline fraction and hydrogenized diesel oil fraction; a bulk polymerization in which olefin itself is used as a solvent; and gas phase polymerization in which olefin (co) polymerization is effected in the gas phase; and liquid phase polymerization in which polyolefin generated by (co) polymerization is in the form of liquid. Two or more of the above-mentioned polymerization processes can be combined.

In polymerizing olefin, the compounds (A) and (B), or (A), (B) and (C) may be previously mixed in an inactive solvent, and then the mixture may be supplied to a polymerization reaction system. Alternatively, the compounds (A) and (B), or (A), (B) and (C) may be supplied to a polymerization reaction system separately. Furthermore, the following process is effective to obtain an olefin (co) polymer (I) having satisfactorily shaped particles and is in the scope of the present invention. Prior to the main polymerization of olefin, a preliminary activating treatment is performed in which a small amount of olefin, more specifically, about 1 g to 500 kg per mmol of the transition metal in the compound (A), is allowed to react and be polymerized with the compounds (A) and (B) or (A), (B) and (C) in an inactive solvent, so as to prepare a preliminary activated catalyst. Then, the main polymerization of olefin is performed.

A preferable olefin that can be used in the preliminary activating treatment is α-olefin having 2 to 12 carbon atoms. Specific examples thereof include ethylene, propylene, butene, pentene, hexene, octene, 4-methyl-1-pentene or the like. Among these, ethylene, propylene and 4-methyl-1-pentene can be most preferably used.

The thus prepared catalyst or the preliminarily activated catalyst is used for the polymerization of olefin by the above-mentioned known polymerization methods. For example, the polymerization of propylene generally can be performed under the same polymerization conditions as in the known polymerization of olefin with a Ziegler-Natta catalyst. More specifically, the polymerization is performed at a temperature of −50 to 150° C., preferably −10 to 100° C.; an atmospheric pressure of 0.1 MPa to 7 MPa, preferably 0.2 MPa to 5 MPa; generally for 1 min to 20 hours. The molecular weight of the obtained olefin (co)polymer can be adjusted by selecting a suitable polymerization condition or introducing hydrogen atom, which is a molecular weight modifier to the polymerization system.

After the (co)polymerization of olefin is complete, post-treatment processes such as a catalyst deactivating treatment process, a catalyst residue removing process and a drying process are performed, if necessary. Thus, an olefin (co)polymer (I) having an intrinsic viscosity $[\eta_I]$ measured in tetralin at 135° C. of 0.2 to 10 dl/g for use in the present invention can be obtained.

The olefin composition (II) of the present invention comprises 0.01 to 5 parts by weight of the following olefin component (II-1) and 100 parts by weight of the following olefin component (II-2).

(II-1): a high molecular weight olefin (co)polymer having an intrinsic viscosity $[\eta_E]$ measured in tetralin at 135° C. of 15 to 100 dl/g.

(II-2): olefin (co)polymers other than the high molecular weight olefin component (II-1).

Polyethylene, a typical example of component (II-1), has an intrinsic viscosity $[\eta_E]$ measured in tetralin at 135° C. of 15 to 100 dl/g, and is suitably an ethylene homopolymer, an ethylene-olefin copolymer containing at least 50 wt % ethylene polymerization units, preferably an ethylene homopolymer or an ethylene-olefin copolymer containing at least 70 wt % ethylene polymerization units, and more preferably an ethylene homopolymer or an ethylene-olefin copolymer containing at least 90 wt % ethylene polymerization units. These (co)polymers can be used alone, or in combinations of two or more.

When the polyethylene of component (II-1) has an intrinsic viscosity $[\eta_E]$ less than 15 dl/g, a polypropylene composition (illustrative example) which is an obtained olefin composition (II) has a poorly improved melt tension. Furthermore, although there is no particular limitations of the upper limit of the intrinsic viscosity $[\eta_E]$, if there is a large difference between the intrinsic viscosity $[\eta_E]$ and the intrinsic viscosity $[\eta_P]$ of polypropylene (illustrative example) which is an olefin component (II-2), the polyethylene of component (II-1) is not sufficiently dispersed in the polypropylene of component (II-2) when preparing a composition, resulting in a poor melt tension. Moreover, in view of efficiency in production, the upper limit is preferably about 100 dl/g.

The intrinsic viscosity $[\eta_E]$ of the polyethylene of component (II-1) is in the range from 15 to 100 dl/g, preferably the range from 17 to 50 dl/g. Furthermore, since polyethylene of component (II-1) is required to have a high molecular weight to an extent that the intrinsic viscosity $[\eta_E]$ measured in tetralin at 135° C. is 15 dl/g, the ethylene polymerization unit is preferably contained in an amount of 50 wt % or more.

The olefin other than ethylene that is copolymerized with ethylene constituting the polyethylene of component (II-1) is not particularly limited, but an olefin having 3 to 12 carbon atoms is preferably used. Specific examples thereof include propylene, 1-butene, 1-pentene, 1-hexene, 1-octene, 1-decene, 4-methyl-1-pentene, 3-methyl-1-pentene or the like. These olefins can be used alone or in combinations of two or more.

The density of the polyethylene of component (II-1) is preferably about 880 to 980 g/l, although it is not particularly limited thereto.

Hereinafter, the olefin (co)polymer of component (II-2) will be described by taking polypropylene as an illustrative example. In the description of the olefin (co)polymer of composition (II), a polypropylene composition is also taken as an example.

The polypropylene of component (II-2) is a crystalline polypropylene having an intrinsic viscosity $[\eta_P]$ measured in tetralin at 135° C. of 0.2 to 10 dl/g, and is suitably a propylene homopolymer, or a propylene-olefin random copolymer or a propylene-olefin block copolymer containing at least 50 wt % propylene polymerization units, preferably a propylene homopolymer, or a propylene-olefin random copolymer containing at least 90 wt % propylene polymerization units, or a propylene-olefin block copolymer containing at least 70 wt % propylene polymerization units. These (co)polymers can be used alone, or in combinations of two or more.

The intrinsic viscosity $[\eta_P]$ of the polypropylene of component (II-2) is in the range from 0.2 to 10 dl/g, preferably the range from 0.5 to 8 dl/g.

When the intrinsic viscosity $[\eta_P]$ of the polypropylene of component (II-2) is less than 0.2 dl/g, the obtained polypropylene composition (II) has poor mechanical characteristics. When it exceeds 10 dl/g, the formability of the obtained polypropylene composition (II) is poor.

The olefins other than propylene that are copolymerized with the propylene constituting the polypropylene of component (II-2) are not particularly limited, but an olefin having 2 to 12 carbon atoms is preferably used. Specific examples thereof include ethylene, 1-butene, 1-pentene, 1-hexene, 1-octene, 1-decene, 4-methyl-1-pentene, 3-methyl-1-pentene or the like. These olefins can be used alone or in combinations of two or more.

There is no particular limitation on the stereoregularity of the polypropylene of component (II-2). Any crystalline polypropylene that can achieve the object of the present invention can be used. A preferable example is specifically polypropylene that has a crystallinity of 0.80 to 0.99, preferably 0.85 to 0.99, and most preferably 0.90 to 0.99, with respect to the isotactic pentad ratio (mmmm) measured with $^{13}$C-NMR (nuclear magnetic resonance spectrum).

The isotactic pentad fraction (mmmm) has been proposed by A. Zambelli et al (Macromolecules[6], 925 (1973)) and is measured by $^{13}$C-NMR. It is the isotactic fraction of the pentad units in the polypropylene molecular chains and has been determined here by the assignment determination technique for peaks in the spectroscopic measurement as proposed by A. Zambelli et al (Macromolecules 8, 687 (1975)). To be specific, the measurement was performed at 67.20 MHz, 130° C., using a compound solution of o-dichlorobenzene/benzene bromide with a weight ratio of 8:2 and a polymer concentration of 20 wt %. As measuring equipment, e.g. a JEOL-GX270 NMR measuring device (a product of NIHON DENSHI Co.) can be used.

The polypropylene composition (II) of the present invention comprises 0.01 to 5 parts by weight, preferably 0.02 to 2 parts by weight, more preferably 0.05 to 1 parts by weight of polyethylene of component (II-1) and 100 parts by weight of polypropylene of component (II-2).

When the polyethylene of component (II-1) is contained at less than 0.01 parts by weight, an obtained polypropylene composition (II) has a poorly improved melt tension. Furthermore, it is not preferable to contain more than 5 parts by weight, because the effect is saturated and the homogeneity of the obtained polypropylene composition (II) may be impaired.

The melt tension of the polyolefin composition (II) of component (II) is preferably such that the melt tension (MS) at 230° C. and the intrinsic viscosity $[\eta_{II}]$ measured in tetralin at 135° C. satisfy the following inequity:

$$\log(MS) > 4.24 \times \log[\eta_{II}] - 1.05$$

Although the upper limit is not particularly limited, it is preferably such that the following inequity is satisfied:

4.24×log[η$_H$]+0.05>log(MS)>4.24×log[η$_H$]−1.05, more preferably, 4.24×log[η$_H$]+0.24>log(MS)>4.24×log[η$_H$]−1.05, most preferably, 4.24×log[η$_H$]+0.24>log(MS)>4.24×log[η$_H$]−0.93, because an excessively high melt tension impairs the formability of the composition.

The melt tension at 230° C. is a value (unit: cN) obtained by using MELT TENSION II (manufactured by TOYO SEIKI SEISAKU-SHO, Ltd), heating the olefin (co)polymer composition to 230° C. in the equipment, extruding the molten olefin (co)polymer composition through a nozzle of a diameter of 2.095 mm at a rate of 20 mm/min to the air of 23° C. so as to make a strand, and measuring the tension of a thread like polypropylene composition when taking up the strand at a rate of 3.14 m/min.

Any methods can be used for producing the polypropylene composition (II) of the present invention, as long as the melt tension of the composition is in the above-mentioned range. However, it is more easily produced by using a method of (co)polymerizing propylene or propylene and other olefins in the presence of a catalyst preliminarily activated with ethylene or ethylene and other olefins that will be specifically described later.

The term "preliminary activation" in the specification of the present application refers to a treatment in which a small amount of olefin (generally 5 wt % or less of the amount for the main (co)polymerization) is polymerized with a polyolefin production catalyst, prior to the main polymerization of propylene or propylene and other olefins. By this treatment, in the case of a homogeneous catalyst, a mixture of a small amount of olefin (co)polymer and the homogeneous catalyst (or a mixed slurry in the case where the treatment is performed in the presence of a solvent) is obtained. In the case of a catalyst comprising a transition metal compound catalyst composition supported by a support, the surface of the supported transition metal compound catalyst composition (solid) is coated with olefin (co)polymers (olefin (co)polymers are supported thereon).

The preliminarily activated catalyst used for producing the polypropylene composition (II) of the present invention can be prepared by using either a metallocene catalyst used for producing the olefin (co)polymer (I) of the present invention or a widely and commercially available transition metal compound catalyst composition containing titanium compounds. For example, in the case where a transition metal compound catalyst composition containing titanium compounds is used, the preliminarily activated catalyst comprises the transition metal compound catalyst composition as the base component and the following components:

(1) a polyolefin production catalyst comprising 0.01 to 1,000 mols of organic metal compounds (AL1) of a metal selected from the group consisting of metals belonging to Group I (e.g. Li and Na), Group II (e.g. Mg), Group XII (e.g. Zn), and Group XIII (e.g. Al) of the periodic table (1991) (described in the fourth edition of Chemical Guide, Basics I edited by the Chemical Society of Japan published by Maruzen) per mol of the transition metal atom; and (2) 0 to 500 mols of the electron donor (E1) per mol of the transition metal atom;

(3) 0.01 to 100 g of the polypropylene (B) for the main (co)polymerization having an intrinsic viscosity [η$_B$] measured in tetralin at 135° C. of less than 15 dl/g per gram of the transition metal compound catalyst composition; and

(4) 0.01 to 5,000 g of the polyethylene (A) having an intrinsic viscosity [η$_A$] measured in tetralin at 135° C. of 15 to 100 dl/g per gram of the transition metal compound catalyst composition, which are supported by the polyolefin production catalyst.

For the preliminarily activated catalyst, any of known catalyst compositions comprising the transition metal compound catalyst composition containing at least titanium compounds proposed for a catalyst for producing polyolefin can be used as the transition metal compound catalyst composition. Among these, a titanium containing solid catalyst is preferably used in view of industrial production.

As the titanium containing solid catalyst composition, the following were proposed: a titanium containing solid catalyst composition comprising a titanium trichloride composition (as disclosed in Japanese Patent Publication Nos. 56-3356, 59-28573, 63-66323), a supported Ti catalyst composition comprising titanium, magnesium, halogen and electron donors as essential components in which titanium tetrachloride is supported by the magnesium (as disclosed in Japanese Patent Application Publication Nos. 62-104810, 62-104811, 62-104812, 57-63310, 57-63311, 58-83006, 58-138712). Any of these can be used.

Examples of the organic metal compound (AL1) include a compound having an organic group of a metal selected from the group consisting of Group I, Group II, Group XII and Group XIII of the periodic table (1991), such as an organic lithium compound, an organic sodium compound, an organic magnesium compound, an organic zinc compound, an organic aluminum compound, or the like. The organic metal compound can be used in combination with the transition metal compound catalyst composition.

Among these, the organic aluminum compound expressed by chemical formula 5 below preferably can be used.

(chemical formula 5)

$AlR^1_p R^2_q X_{3(P+q)}$ (where $R^1$ and $R^2$ are of the same type or different types of a hydrocarbon group such as an alkyl group, a cycloalkyl group, an aryl group or the like, or an alkoxy group; X is a halogen atom, and p and q are positive integers satisfying the following inequity: $0<p+q\leq 3$.)

Specific examples of the organic aluminum compound include trialkyl aluminum such as trimethyl aluminum, triethyl aluminum, tri-n-propyl aluminum, tri-n-butyl aluminum, tri-i-butyl aluminum, tri-n-hexyl aluminum, tri-i-hexyl aluminum, tri-n-octyl aluminum or the like, dialkyl aluminum monohalides such as diethyl aluminum chloride, di-n-propyl aluminum chloride, di-i-butyl aluminum chloride, diethyl aluminum bromide, diethyl aluminum iodide or the like, dialkyl aluminum hydrides such as diethyl aluminum hydride or the like, alkyl aluminum sesquihalides such as ethyl aluminum sesquichloride or the like, monoalkyl aluminum dihalide such as ethyl aluminum dichloride or the like, and alkoxyalkyl aluminum such as diethoxymonoethyl aluminum or the like. Trialkyl aluminum or dialkyl aluminum monohalide is preferably used. These organic aluminum compounds can be used alone or in combinations of two or more.

The electron donor (E1) is used for the purpose of regulating the generation speed and/or the stereoregularity of polyolefin, if necessary.

Examples of the electron donor (E1) include an organic compound having any of oxygen, nitrogen, sulfur and phosphorus in the molecules of ethers, alcohol, esters, aldehydes, fatty acids, ketones, nitriles, amines, amides, ureas and thioureas, isocyanate, azo compounds, phosphines, phosphites, phosphinates, hydrogen sulfides, thioethers, neoalcohol, silanol, and an organic silicon compound having Si—O—C bonds in the molecules.

Examples of ethers include dimethyl ether, diethyl ether, di-n-propyl ether, di-n-butyl ether, di-i-amyl ether, di-n-pentyl ether, di-n-hexyl ether, di-i-hexyl ether, di-n-octyl ether, di-i-octyl ether, di-n-dodecyl ether, diphenyl ether, ethylene glycol monoethyl ether, diethylene glycol dimethyl ether, tetrahydrofuran, or the like. Examples of alcohols include methanol, ethanol, propanol, butanol, pentanol, hexanol, octanol, 2-ethyl hexanol, allyl alcohol, benzyl alcohol, ethylene glycol, glycerin or the like. Examples of phenols include phenol, cresol, xylenol, ethyl phenol, naphthol or the like.

Examples of esters include monocarboxylic acid ester such as methyl methacrylate, methyl formate, methyl acetate, methyl butyrate, ethyl acetate, vinyl acetate, propyl-n-acetate, propyl-i-acetate, butyl formate, amyl acetate, butyl-n-acetate, octyl acetate, phenyl acetate, ethyl propionate, methyl benzoate, ethyl benzoate, propyl benzoate, butyl benzoate, octyl benzoate, 2-ethylhexyl benzoate, toluic acid methyl ester, toluic acid ethyl ester, anisic acid methyl ester, anisic acid ethyl ester, anisic acid propyl ester, anisic acid phenyl ester, ethyl cinnamate, naphthoic acid methyl ester, naphthoic acid ethyl ester, naphthoic acid propyl ester, naphthoic acid butyl ester, 2-ethylhexyl naphthoic acid, ethyl phenylacetate or the like, aliphatic polycarboxylic acid ester such as diethyl succinate, methylmalonic acid diethyl ester, butylmalonic acid diethyl ester, dibutyl maleate, diethyl butylmaleic acid or the like, and aromatic polycarboxylic acid ester such as monometyl phthalate, dimetyl phthalate, dietyl phthalate, di-n-propyl phthalate, mono-n-butyl phthalate, di-n-butyl phthalate, diisobutyl phthalate, di-n- heptyl phthalate, di-2-ethylhexyl phthalate, di-n-octyl phthalate, diethyl isophthalate, dipropyl isophthalate, dibutyl isophthalate, 2-ethylhexyl diisophthalate, diethyl terephthalate, dipropyl terephthalate, dibutyl terephthalate, naphthalenedicarboxylic acid diisobutyl ester or the like.

Examples of aldehyde include acetaldehyde, propionaldehyde, benzaldehyde or the like. Examples of carboxylic acids include monocarboxylic acid such as formic acid, acetic acid, propionic acid, butyric acid, oxalic acid, succinic acid, acrylic acid, maleic acid, valeric acid, benzoic acid, and acid anhydride such as benzoic anhydride, phthalic anhydride, tetrahydrophthalic anhydride. Examples of ketone include acetone, methylethyl ketone, methylisobutyl ketone, benzophenone or the like.

Examples of a nitrogen-containing compound include nitriles such as acetonitrile, benzonitrile or the like, amine such as methyl amine, diethyl amine, tributyl amine, triethanolamine, β(N,N-dimethylamino)ethanol, pyridine, quinoline, α-picoline, 2,4,6-trimethyl pyridine, 2,2,5,6-tetramethyl piperidine, 2,2,5,5-tetramethyl pyrrolidine, N,N, N',N'-tetramethyl ethylenediamine, aniline, dimethyl aniline or the like, amides such as formamide, hexamethyl phosphoric acid triamide, N,N,N',N',N"-pentamethyl-N'-β-dimethylaminomethyl phosphoric acid triamide, octamethyl pyrophosphoramide or the like, urea such as N,N,N',N',-tetramethyl urea or the like, isocyanates such as phenyl isocyanate, toluyl isocyanate or the like, and an azo compound such as azobenzene or the like.

Examples of a phosphorus containing compound include phosphines such as ethyl phosphine, triethyl phosphine, di-n-octyl phosphine, tri-n-octyl phosphine, triphenyl phosphine, triphenyl phosphine oxide, and phosphites such as dimethyl phosphite, di-n-octyl phosphite, triethyl phosphite, tri-n-butyl phosphite, triphenyl phosphite or the like.

In the preliminarily activated catalyst, the polyethylene (A) is an ethylene homopolymer or a copolymer of ethylene comprising at least 50 wt %, preferably at least 70 wt %, more preferably at least 90 wt % ethylene polymerization units and olefin having 3 to 12 carbon atoms, having an intrinsic viscosity $[\eta_A]$ measured in tetralin at 135° C. of 15 to 100 dl/g, preferably 17 to 50 dl/g. The polyethylene (A) constitutes the final polyethylene of component (II-1) of a polypropylene composition of the present invention. Therefore, the intrinsic viscosity $[\eta_E]$ of the polyethylene of component (II-1) and the intrinsic viscosity $[\eta_A]$ of the polyethylene (A) satisfy the equation: $[\eta_E]=[\eta_A]$.

The polyethylene (A) is supported in an amount of 0.01 to 5,000 g, preferably 0.05 to 2,000 g, more preferably 0.1 to 1,000 g per gram of the transition metal compound catalyst composition. When the supported amount per gram of the transition metal compound catalyst composition is less than 0.01 g, the finally obtained polypropylene composition (II) in the main (co)polymerization has a poorly improved melt tension. On the other hand, the supported amount of more than 5,000 g is not preferable not only because the improvement is not remarkable, but also the homogeneity of the finally obtained polypropylene composition (II) may deteriorate.

The polypropylene (B) is polypropylene having the same composition of the polypropylene of component (II-2) obtained by the main (co)polymerization having an intrinsic viscosity $[\eta_B]$ measured in tetralin at 135° C. of less than 15 dl/g. Polypropylene (B) is incorporated and finally forms a part of the polypropylene of component (II-2) of the polypropylene composition of the present invention. The polypropylene (B) is a component for providing a dispersibility of the polyethylene (A) in the finally obtained polypropylene composition. Therefore, it is preferable that the intrinsic viscosity $[\eta_B]$ of the polypropylene (B) be less than the intrinsic viscosity $[\eta_A]$ of the polyethylene (A), and more than the intrinsic viscosity $[\eta_H]$ of the finally obtained polypropylene composition (II).

The polypropylene (B) is supported, preferably in an amount of 0.01 to 100 g per gram of the transition metal compound catalyst composition, in other words, 0.001 to 1 wt % on the basis of the finally obtained polypropylene composition. When the polypropylene (B) is supported in a small amount, the polyethylene (A) is insufficiently dispersed in the targeted polypropylene composition. With an excessively large amount, not only is the dispersibility of the polyethylene (A) in the polypropylene composition saturated, but also the production efficiency of the preliminary activated catalyst is reduced.

In the present invention, the preliminarily activated catalyst for use in the production of the polypropylene composition (II) is produced by a preliminary activating treatment comprising the steps of preliminarily (co)polymerizing propylene for the main polymerization or propylene and other olefins in the presence of the polyolefin production catalyst comprising the transition metal compound catalyst compound containing at least titanium compounds, the organic metal compound (AL1) and the electron donor (E1), if necessary, so as to generate the polypropylene (B), and then preliminarily activating and (co)polymerizing ethylene or ethylene and other olefins so as to generate polyethylene (A), thereby allowing the transition metal compound catalyst composition to support the polypropylene (B) and the polyethylene (A).

In the preliminary activating treatment, a polyolefin production catalyst is used. The polyolefin production catalyst comprises the transition metal compound catalyst composition, 0.01 to 1,000 mols, preferably 0.05 to 500 mols of the organic metal compounds (AL1) per mol of the transition metal atom in the transition metal compound catalyst composition, and 0 to 500 mols, preferably 0 to 100 mols of the electron donor (E1) per mol of the transition metal atom.

The polyolefin production catalyst is prepared in an amount of 0.001 to 5,000 mmols, preferably 0.01 to 1,000 mmols per liter of (co)polymerization volume of ethylene or ethylene and other olefins, on the basis of the transition metal atom in the transition metal compound catalyst compositions. Propylene or a mixture of propylene and other olefins is supplied in an amount of 0.01 to 500 g to the polyolefin production catalyst and preliminarily (co) polymerized in the absence of a solvent, or in the presence of a solvent in an amount less than 100 liters per gram of the transition metal compound catalyst composition, so as to generate 0.01 to 100 g of polypropylene (B) per gram of the transition metal compound catalyst composition. Then, ethylene or a mixture of ethylene and other olefins is supplied in an amount of 0.01 to 10,000 g and preliminarily activated and (co)polymerized, so as to generate 0.01 to 5,000 g of polyethylene (A) per gram of the transition metal compound catalyst composition. Thus, the polypropylene (B) and the polyethylene (A) are supported by the transition metal compound catalyst composition.

In the specification of the present application, the term "polymerization volume" refers to a volume of the liquid phase portion in a polymerization reactor in the case of liquid layer polymerization, and a volume of the gas phase portion in a polymerization reactor in the case of gas phase polymerization.

The amount of the transition metal compound catalyst composition used is preferably within the above-mentioned range so as to maintain an efficient and controlled reaction rate of the propylene (co)polymerization. Furthermore, an excessively small amount of the organic metal compound (AL1) reduces the (co)polymerization reaction rate, and a large amount is also not preferable not only because the (co)polymerization reaction rate is not correspondingly raised, but also a large amount of residue of the organic metal compound (AL1) is present in the finally obtained polypropylene composition. Furthermore, a large amount of the electron donor (E1) reduces the (co)polymerization reaction rate. When the solvent is used in a large amount, not only a large reactor is required, but also it is difficult to control and maintain an efficient (co)polymerization reaction rate.

The preliminary activating treatment can be performed in an aliphatic hydrocarbon such as butane, pentane, hexane, heptane, octane, isooctane, decane, dodecane or the like, an alicyclic hydrocarbon such as cyclopentane, cyclohexane, methylcyclohexane or the like, an aromatic hydrocarbon such as toluene, xylene, ethylbenzene or the like, or an inactive solvent such as gasoline fraction and hydrogenized diesel oil fraction, or a liquid phase in which olefin itself is used as a solvent, or in the gas phase without using a solvent.

The preliminary activating treatment can be performed in the presence of hydrogen atoms, but it is preferable not to use hydrogen atoms in order to generate high molecular weight polyethylene (A) having an intrinsic viscosity $[\eta_A]$ of 15 to 100 dl/g.

In the preliminary activating treatment, propylene or a mixture of propylene and other olefins is (co)polymerized under any conditions, as long as polypropylene (B) is generated in an amount of 0.01 to 100 g per gram of the transition metal compound catalyst composition. Generally, the (co)polymerization is effected at a temperature of 40° C. to 100° C. at a pressure of 0.1 MPa to 5 MPa for 1 min to 24 hours. Furthermore, ethylene or a mixture of ethylene and other olefins is preliminarily activated and (co)polymerized under any conditions, as long as the polyethylene (A) is generated in an amount of 0.01 to 5,000 g, preferably 0.05 to 2,000 g, more preferably 0.1 to 1,000 g per gram of the transition metal compound catalyst composition. Generally, the preliminary activation and (co)polymerization is effected at a relatively low temperature of about −40° C. to 40° C., preferably about −40° C. to 30° C., more preferably about −40° C. to 20° C. at a pressure of 0.1 MPa to 5 MPa, preferably 0.2 MPa to 5 MPa, more preferably 0.3 MPa to 5 MPa for 1 minute to 24 hours, preferably 5 minutes to 18 hours, more preferably 10 minutes to 12 hours.

Furthermore, after the preliminary activating treatment, for the purpose of suppressing the reduction of the activity of the main (co)polymerization due to the preliminary activating treatment, the addition polymerization of propylene or a mixture of propylene and other olefins may be effected so that polypropylene (C) is generated in an amount of 0.01 to 100 g per gram of the transition metal compound catalyst composition. In this case, the amount of the organic metal compound (AL1), the electron donor (E1), a solvent, and propylene or a mixture of propylene and other olefins used can be in the same range as in the preliminarily activating polymerization of ethylene or a mixture of ethylene and other olefins. However, it is preferable to effect the addition polymerization in the presence of 0.005 to 10 mols, preferably 0.01 to 5 mols of the electron donors. The reaction is effected at −40 to 100° C. at a pressure of 0.1 to 5 MPa for 1 minute to 24 hours.

The organic metal compound (AL1), the electron donor (E1) and the solvent for use in the addition polymerization are the same kinds as those used in the preliminarily activating polymerization of ethylene or a mixture of ethylene and other olefins. The propylene or the mixture of propylene and other olefins has the same composition as that for main (co)polymerization.

The intrinsic viscosity $[\eta_C]$ of the polypropylene generated in the addition polymerization is less than the intrinsic viscosity $[\eta_A]$ of the polyethylene (A), and the polypropylene eventually forms a part of the polypropylene obtained by the main (co)polymerization.

The preliminarily activated catalyst can be used in the main (co)polymerization of olefin having 2 to 12 carbon atoms to obtain a targeted polypropylene composition as a catalyst for the main olefin (co)polymerization alone or in combination with additional organic metal compounds (AL2) and electron donors (E2).

The catalyst for the main olefin (co)polymerization comprises the preliminarily activated catalyst, the organic metal compound (AL2) and the electron donors (E1). The amount of the organic metal compound (AL2) is such that the amount of the sum (AL1+AL2) of the organic metal compound (AL1) in the preliminarily activated catalyst and the organic metal compound (AL2) is 0.05 to 3,000 mols, preferably 0.1 to 1,000 mols, per mol of the transition metal atom in the activated catalyst. The amount of the electron donor (E1) is such that the amount of the sum (E1+E2) of the electron donors (E1) in the preliminarily activated catalyst and the electron donors (E2) is 0 to 5,000 mols, preferably 0 to 3,000 mols, per mol of the transition metal atom in the activated catalyst.

An excessively small amount of the organic metal compounds (AL1+AL2) reduces the reaction rate in the main (co)polymerization of propylene and other olefins. An excessively large amount is also not preferable not only because the (co)polymerization reaction rate is not correspondingly raised, but also a large amount of residues of the organic metal compounds are present in the finally obtained polypropylene composition. Furthermore, an excessively large amount of the electron donors (E1+E2) reduces the (co)polymerization reaction rate significantly.

The organic metal compound (AL2) and the electron donor (E2) added to the main olefin (co)polymerization catalyst, if necessary, can be the same kinds as those for the organic metal compound (AL1) and the electron donor (E1). Furthermore, one kind may be used alone, or two or more kinds can be mixed. Alternatively, the organic metal compound (AL2) and the electron donor (E2) may be the same as those used in the preliminary activating treatment or different therefrom.

The main olefin (co)polymerization catalyst may be combined with powder particles obtained by filtration or decantation for removing the solvent, unreacted olefin, the organic metal compound (AL1) and the electron donor (E1) present in the preliminarily activated catalyst or a suspension of the powder particles added with a solvent, and the additional organic metal compound (AL2) and the electron donor (E2), if desired. Alternatively, the main olefin (co)polymerization catalyst may be combined with powder particles obtained by evaporating the solvent and unreacted olefin by vacuum distillation, inert gas stream or the like or a suspension of the powder particles added with a solvent, and the organic metal compound (AL2) and the electron donor (E2), if desired.

In a method for producing a modified polypropylene composition of a second invention of the present invention, the preliminarily activated catalyst or the main olefin polymerization catalyst is used in an amount of 0.001 to 1,000 mmols, preferably 0.005 to 500 mmols per liter of the polymerization volume, on the basis of the transition metal atom in the preliminarily activated catalyst. The transition metal compound catalyst composition is used in the above-mentioned amount, so that an efficient and controlled reaction rate of the (co)polymerization of propylene or a mixture of propylene and other olefins can be maintained.

The main olefin (co)polymerization of propylene or a mixture of propylene and other olefins for the production of the polypropylene composition (II) using the preliminarily activated catalyst of the present invention can be effected in a known olefin (co)polymerization process, for example, a slurry polymerization method in which olefin is (co) polymerized in an aliphatic hydrocarbon such as propane, butane, pentane, hexane, heptane, octane, isooctane, decane, dodecane or the like, an alicyclic hydrocarbon such as cyclopentane, cyclohexane, methylcyclohexane or the like, an aromatic hydrocarbon such as toluene, xylene, ethylbenzene or the like, or an inactive solvent such as gasoline fraction and hydrogenized diesel oil fraction; a bulk polymerization method in which the olefin itself is used as a solvent; and a gas phase polymerization method in which olefin (co)polymerization is effected in the gas phase; and a liquid phase polymerization method in which polyolefin generated by (co)polymerization is in the form of liquid. Two or more of the above-mentioned polymerization processes can be combined.

Regardless of the polymerization process, the polymerization is performed at a temperature of 20 to 120° C., preferably 30 to 100° C., and more preferably 40 to 100° C. at a pressure of 0.1 to 5 MPa, preferably 0.3 MPa to 5 MPa generally for 5 min to 24 hours continuously, semi-continuously or by the batch. By adopting the above-mentioned polymerization conditions, polypropylene of component (II-2) can be generated highly efficiently and with a controlled reaction rate.

In a more preferable embodiment of the method for producing a polypropylene composition (II) of the present invention, the polymerization conditions are selected so that the intrinsic viscosity $[\eta_{II}]$ of the polypropylene of component (II-2) generated in the main (co)polymerization and the finally obtained polypropylene composition is in the range from 0.2 to 10 dl/g, preferably 0.7 to 5 dl/g, and that the obtained polypropylene composition (II) contains 0.01 to 5 wt % of the polyethylene (A) derived from the used preliminarily activated catalyst. Furthermore, as in a known olefin polymerization method, the molecular weight of the obtained (co)polymer can be adjusted by using hydrogen during polymerization.

After the main (co)polymerization is complete, known post-treatment processes such as a catalyst deactivating treatment process, a catalyst residue removing process, a drying process or the like are performed, if necessary. Thus, a polypropylene composition having a high melt tension and a high crystallization temperature can be obtained as a final product.

In the method for producing the polypropylene composition (II) of the present invention, the high molecular weight polyethylene (A) is generated by the preliminary activating process, and is dispersed in the finally obtained polypropylene composition uniformly. Therefore, it is possible to prepare a necessary amount of the preliminarily activated catalyst in a large amount. Moreover, since regular olefin (co)polymerization by using a known process can be used for the main co)polymerization of propylene or propylene and other olefins, the same amount can be produced as that in regular polyolefin production.

By using the method for producing a polypropylene composition (GI) employing the preliminarily activated catalyst of the present invention, it is possible to easily obtain a polypropylene composition that satisfies the above-mentioned relationship between the melt tension (MS) at 230° C. and the intrinsic viscosity $[\eta_{II}]$ measured in tetralin at 135° C., as described above.

The olefin (co)polymer composition of the present invention comprises 99 to 50 wt % of the thus obtained olefin (co)polymer (I) and 1 to 50 wt % of the thus obtained olefin composition (II).

A variety of additives such as an antioxidant, an ultraviolet absorber, an antistatic agent, a nucleating agent, a lubricant, a flame retardant, an anti-blocking agent, a coloring agent, an inorganic or organic filler or the like, or a variety of synthetic resins can be mixed with the olefin (co)polymer composition of the present invention, as long as the objects of the present invention can be achieved. The olefin (co)polymer composition is generally heated, melted and kneaded, and then cut into granular pellets for formation into a variety of products.

The olefin (co)polymer composition of the present invention can be produced by utilizing a known method such as:
(1) a method of blending the olefin (co)polymer (I) and composition (II) and other optional components mechanically with an extruder, a kneader or the like;
(2) a method of dissolving the olefin (co)polymer (I) and composition (II) and other optional components in a suitable good solvent (e.g., a hydrocarbon solvent such as hexane, heptane, decane, cyclohexane, benzene, toluene and xylene) and then removing the solvent;

(3) a method of preparing a solution in which each of the olefin (co)polymer (I) and composition (II), and other optional components is dissolved independently in a suitable good solvent, mixing the prepared solutions and then removing the solvent;

(4) a method combining the above methods (1) to (3); and (5) a method of performing polymerization in two or more steps under different reaction conditions where the olefin (co)polymer (I) is produced in at least one step and the olefin composition (II) is produced in another step, alternatively, using a plurality of polymerization reactors, in one of which the olefin (co)polymer (I) is produced, and in another of which the composition (II) is produced.

The thus obtained olefin (co)polymer composition of the present invention has the melt tension (MS) at 230° C. and the melt flow rate (MFR) measured under a load of 21.18N at 230° C. that satisfy the following inequality:

$$\log(MS) > -1.28 \times \log(MFR) + 0.44$$

As described above, the olefin (co)polymer composition of the present invention obtained by using a metallocene catalyst type has high melt tension and excellent formability.

EXAMPLES

Hereinafter, the present invention will be more specifically described by way of examples and comparative examples.

The definition of terms and measurement methods used in the Examples and Comparative Examples are as follows.

Intrinsic viscosity $[\eta]$: a value (unit: dl/g) as a result of measurement by an Ostwald's viscometer (manufactured by Mitsui Toatsu Chemicals, Inc.) of an intrinsic viscosity measured in tetralin at 135° C.

Melt flow rate (MFR): a value (unit: g/10 min.) as a result of measurement under the condition 14 (under a load of 21.18 N at 230° C.) shown in Table 1 described in JIS (Japanese Industrial Standard) K7210 for Testing Method for Melt Flow Rate of Thermoplastics.

Melt tension (MS): a value (unit: cN) as a result of measurement by using MELT TENSION II (manufactured by TOYO SEIKI SEISAKU-SHO, Ltd). The melt tension at 230° C. is a value obtained by heating the olefin (co)polymer composition to 230° C. in the equipment, extruding the molten olefin (co)polymer composition through a nozzle of a diameter of 2.095 mm at a rate of 20 mm/min to the air of 23° C. so as to make a strand, and measuring the tension of a thread like polypropylene composition when taking up the strand at a rate of 3.14 m/min.

Melting point (Tm): a temperature at a peak of melting obtained by using a differential scanning calorimeter VII (manufactured by PERKIN-ELMER Ltd.), warming the olefin (co)polymer composition from room temperature to 230° C. at 30° C./min, allowing it to stand at 230° C. for 10 min., cooling it to −20° C. at −20° C./min., allowing it to stand at −20° C. for 10 min., and warming it at 20° C./min to reach a peak of melting.

Crystallization temperature (Tc): a temperature (unit:° C.) at a peak of crystallization obtained by using a differential scanning calorimeter VII (manufactured by PERKIN-ELMER Ltd.), warming the olefin (co)polymer composition from room temperature to 230° C. at 30° C./min, allowing it to stand at 230° C. for 10 min., cooling it to −20° C. at −20° C./min., allowing it to stand at −20° C. for 10 min., warming it to 230° C. at 20° C./min, allowing it to stand at 230° C. for 10 min., cooling it to 150° C. at −80° C./min, and further cooling it from 150° C. at −5° C./min to reach a peak of crystallization.

Molecular weight distribution (Mw/Mn): Mw, Mn and Mw/Mn are obtained on the basis of measurement results by Gel permeation chromatography by using an o-dichlorobenzene solution of a polymer concentration of 0.05 wt % and a mixing polystyrene gel column (e.g., PSKgel GMH6-HT manufactured by TOSOH CORPORATION), and performing measurement at 135° C. The measuring equipment, for example, is GPC-150 manufactured by Waters).

Example 1

(1) Production of Olefin (co)polymer (I) (Polypropylene Polymerization)

First, the air in a stainless steel polymerization reactor provided with an inclined turbine agitator having an inner volume of 100 dm³ was replaced with a nitrogen gas. Then, 50 dm³ of toluene, 2.3 mol (per mol of Al atom) of a toluene solution of methylaluminoxane (product name: MMAO manufactured by TOSOS AKZO CORPORATION, a concentration of 2 mol/dm³) and a mixture of 2.1×10⁻⁴ mol of chiral dimethylsilylene (2,3,5-trimethylcyclopentadienyl) (2',4',5'-trimethylcyclopentadienyl)hafnium dichloride as metallocene and 0.2×10⁻⁴ mol of dimethylsilylene (2,3,5-trimethylcyclopentadienyl) (2',3',5'-trimethylcyclopentadienyl)hafnium dichloride of a meso compound as metallocene together with 0.3 dm³ of toluene were introduced into the polymerization reactor at 20° C. Then, 0.08 mol of hydrogen atoms was introduced, and the temperature in the polymerization reactor was raised to 30° C. Then, propylene was supplied to the polymerization reactor continuously for four hours while maintaining the polymerization temperature at 30° C. and the pressure in the gas phase portion in the polymerization reactor at 0.8 MPa, so as to polymerize the propylene (main polymerization).

After completing the polymerization, unreacted propylene was discharged from the polymerization reactor, and 3 dm³ of 2-propanol was introduced to the polymerization reactor, so as to deactivate the catalyst while stirring at 30° C. for 10 min. Then, 0.2 dm³ of an aqueous solution of hydrogen chloride (concentration: 12 mol/dm³) and 8 dm³ of methanol were added, and treated at 60° C. for 30 min. Thereafter, stirring was stopped, and the water phase portion was removed from the lower part of the polymerization reactor, the same amount of aqueous solution of hydrogen chloride and methanol were added and the same operation was repeated. Then, 0.02 dm³ of an aqueous solution of sodium hydroxide (concentration: 5 mol/dm³), 2 dm³ of water and 2 dm³ of methanol were added, and stirred at 30° C. for 10 min. Thereafter, stirring was stopped, and the water phase portion was removed from the lower part of the polymerization reactor, and 8 dm³ of water was further added and stirred at 30° C. for 10 min, and the water phase portion was removed. This operation was repeated twice. Thereafter, a polymerized slurry was extracted from the polymerization reactor, and filtered and dried. Thus, a polypropylene composition (I) of the olefin (co)polymer (I) of the present invention having a MFR of 3.6 dg/min and an intrinsic viscosity $[\eta_I]$ of 1.92 dl/g was obtained in an amount of 3.2 kg.

(2) Production of Olefin Composition (II)
(2-1) Preparation of Transition Metal Compound Catalyst Composition In a stainless steel reactor with an agitator, 0.3 liter of decane, 48 g of magnesium chloride anhydride, 170 g of orthotitanate-n-butyl and 195 g of 2-ethyl-1-hexanol were mixed and heated to 130° C. for 1 hour while being stirred so as to be dissolved. Thus, a homogeneous solution was prepared. The homogeneous solution was warmed to 70° C., and 18 g of diisobutyl phthalate was added to the solution while being stirred, and allowed to stand for one hour. Then, 520 g of silicon tetrachloride was added over 2.5 hours so as to precipitate a solid, and further heated to 70° C. and retained at 70° C. for one hour. The solid was separated from the solution and washed with hexane to obtain a solid product.

The full amount of the solid product was mixed with 1.5 liters of titanium tetrachloride dissolved in 1.5 liters of 1,2-dichloroethane, and 36 g of diisobutyl phthalate was added to the mixture and allowed to react at 100° C. for two hours while being stirred. Then, the liquid phase portion was removed by decantation at the 100° C., and again 1.5 liters of 1,2-dichloroethane and 1.5 liters of titanium tetrachloride were added, stirred and retained at 100° C. for two hours, washed with hexane, and dried, so as to obtain a supported titanium-containing catalyst composition (a transition metal compound catalyst composition) containing 2.8 wt % of titanium.

(2-2) Preparation of Preliminarily Activated Catalyst

First, the air in a stainless steel polymerization reactor provided with an inclined turbine agitator having an inner volume of 5 dm$^3$ was replaced with a nitrogen gas. Then, 2.8 liters of n-hexane, 4 mmols of triethyl aluminum (the organic metal compound (AL1)) and 9.0 g (5.26 mmols per mol of the titanium atom) of the supported titanium containing catalyst composition prepared above were added, and 20 g of propylene was supplied, and thus preliminary polymerization was effected at $-2°$ C. for 10 min.

Polymers separately generated by preliminary polymerization under the same conditions were analyzed. The results were such that 2 g of propylene per gram of the supported titanium containing catalyst composition were converted to the polypropylene (B), and the intrinsic viscosity $[\eta_B]$ of the polypropylene (B) was 2.8 dl/g when measured in tetralin at 135° C.

After the reaction was effected for the predetermined time, unreacted propylene was discharged out of the reactor, the gas phase in the reactor was replaced with a nitrogen gas once, and then ethylene was supplied to the reactor continuously for two hours so that the pressure in the reactor was maintained at 0.59 MPa while the temperature in the reactor was maintained at $-1°$ C. Thus, preliminary activation was performed.

Polymers separately generated by preliminarily activating polymerization under the same conditions were analyzed. The results were such that 24 g of polymers per gram of the supported titanium containing catalyst composition were present, and the intrinsic viscosity $[\eta_{T2}]$ of the polymers was 31.4 dl/g when measured in tetralin at 135° C.

The amount ($W_2$) of the polyethylene (A) per gram of the supported titanium containing catalyst composition generated by the preliminarily activating polymerization of ethylene can be obtained by the following equation as a difference between the amount ($W_{T2}$) of the polymer generated per gram of the supported Ti catalyst composition after the preliminarily activating treatment and the amount ($W_1$) of the polypropylene (B) per gram of the supported Ti catalyst composition after the preliminary polymerization.

$$W_2 = W_{T2} - W_1$$

The intrinsic viscosity $[\eta_A]$ of the polyethylene (A) generated by the preliminary activating polymerization of ethylene can be obtained from the intrinsic viscosity $[\eta_B]$ of the polypropylene (B) generated by the preliminary polymerization and the intrinsic viscosity $[\eta_{T2}]$ of the polymers generated by the preliminary activating treatment by the following equation.

$$[\eta_A] = ([\eta_{T2}] \times W_{T2} - [\eta_B] \times W_1)/(W_{T2} - W_1) = [\eta_E]$$

According to the above equation, the amount of the polyethylene (A) generated by the preliminary activating polymerization of ethylene was 22 g per gram of the supported titanium-containing catalyst composition, and the intrinsic viscosity $[\eta_A]$ thereof was 34.0 dl/g.

After the reaction was effected for the predetermined time, unreacted ethylene was discharged out of the reactor, the gas phase in the reactor was replaced with a nitrogen gas once, and then 1.6 mmols of diisopropyl dimethoxysilane (electron donors (E1)) was supplied to the reactor. Then, 20 g of propylene was supplied and the temperature in the reactor was maintained at 1° C. for 10 min. Thus, addition polymerization after the preliminary activating treatment was performed.

Polymers separately generated by addition polymerization under the same conditions were analyzed. The results were such that 26 g of polymers per gram of the supported titanium-containing catalyst composition were present, and the intrinsic viscosity $[\eta_{T3}]$ of the polymers was 29.2 dl/g when measured in tetralin at 135° C. The amount ($W_3$) of the polypropylene generated by the addition polymerization obtained in the same manner as above was 2 g per gram of the supported titanium-containing catalyst composition, and the intrinsic viscosity $[\eta_C]$ thereof was 2.8 dl/g.

After the reaction was effected for the predetermined time, unreacted propylene was discharged out of the reactor, the gas phase in the reactor was replaced with a nitrogen gas once, and thus a preliminarily activated catalyst slurry for the main (co)polymerization was prepared.

(2-3) Production of Polypropylene Composition (II) (Main (co)polymerization of Propylene)

First, the air in a stainless steel polymerization reactor with an agitator having an inner volume of 500 liters was replaced with a nitrogen gas. Then, 240 liters of n-hexane, 780 mmols of triethyl aluminum (the organic metal compound (AL2)), 78 mmols of diisopropyldimethoxysilane (electron donors (E2)) and a half of the amount of the preliminarily activated catalyst slurry obtained above were introduced into the polymerization reactor. Then, 55 liters of hydrogen was introduced into the polymerization reactor, and heated to 70° C. Then, propylene was supplied to the polymerization reactor continuously for two hours at a temperature of 70° C. while maintaining the pressure in the gas phase portion in the polymerization reactor at 79 MPa, so as to polymerize the propylene (main polymerization).

After the polymerization was effected for the predetermined time, 1 liter of methanol was introduced into the polymerization reactor, a reaction for deactivating the catalyst was effected at 70° C. for 15 min, and then unreacted gas was discharged. Thereafter, the solvent was separated and polymers were dried. Thus, 40.0 kg of polymers having an MFR of 5.8 dg/min and an intrinsic viscosity $[\eta_{II}]$ of 1.8 dl/g were obtained. The obtained polymer was a polypropylene composition (II) containing 0.25 wt % of the polyethylene (A) from preliminary activating polymerization corresponding to component (II-1), and the intrinsic viscosity $[\eta_p]$ of the polypropylene of component (II-2) was 1.81 dl/g.

Furthermore, the melt tension of the thus obtained polypropylene composition (II) was 5.1 cN.

(3) Blend of Olefin (co)polymer (I) and Composition (II)

Ninety parts by weight of the thus produced olefin (co) polymer (I) and 10 parts by weight of the thus produced polypropylene composition (II), 0.1 parts by weight of 2,6-di-t-butyl-p-cresol and 0.1 parts by weight of calcium stearate were mixed, and pellets were produced from the mixture by an extruder with a screw having a diameter of 40 mm at 230° C. When various properties of the pellets were evaluated, the results were such that the MFR was 3.9 dg/min, the melting point was 164.3° C., the crystallization temperature was 120.1° C. and the melt tension (MS) was 0.8 cN. The molecular weight distribution (Mw/Mn) obtained by gel permeation chromatography was 2.1. Other properties are shown in Table 1.

Example 2

Eighty parts by weight of the olefin (co)polymer (I) and 20 parts by weight of the polypropylene composition (II) produced in Example 1, 0.1 parts by weight of 2,6-di-t-butyl-p-cresol and 0.1 parts by weight of calcium stearate were mixed, and pellets were produced from the mixture by an extruder with a screw having a diameter of 40 mm at 230° C. When various properties of the pellets were evaluated, the results were such that the MFR was 4.0 dg/min, the melting point was 164.5° C., the crystallization temperature was 119.7° C. and the melt tension (MS) was 1.0 cN. The molecular weight distribution (Mw/Mn) obtained by gel permeation chromatography was 2.0. Other properties are shown in Table 1.

Example 3

Seventy parts by weight of the olefin (co)polymer (I) and 30 parts by weight of the polypropylene composition (II) produced in Example 1, 0.1 parts by weight of 2,6-di-t-butyl-p-cresol and 0.1 parts by weight of calcium stearate were mixed, and pellets were produced from the mixture by an extruder with a screw having a diameter of 40 mm at 230° C. When various properties of the pellets were evaluated, the results were such that the MFR was 4.1 dg/min, the melting point was 164.5° C., the crystallization temperature was 121.0° C. and the melt tension (MS) was 1.4 cN. The molecular weight distribution (Mw/Mn) obtained by gel permeation chromatography was 2.2. Other properties are shown in Table 1.

Comparative Example 1

A hundred parts by weight of the olefin (co)polymer (I) produced in Example 1, 0.1 parts by weight of 2,6-di-t-butyl-p-cresol and 0.1 parts by weight of calcium stearate were mixed, and pellets were produced from the mixture by an extruder with a screw having a diameter of 40 mm at 230° C. When various properties of the pellets were evaluated, the results were such that the MFR was 3.9 dg/min, the melting point was 164.6° C., the crystallization temperature was 119.4° C. and the melt tension (MS) was 0.4 cN. The molecular weight distribution (Mw/Mn) obtained by gel permeation chromatography was 1.9. Other properties are shown in Table 1.

TABLE 1

|  | Ex. 1 | Ex. 2 | Ex. 3 | Com. Ex. 1 |
|---|---|---|---|---|
| Olefin (co) polymer (I) | 90 | 80 | 70 | 100 |
| Polypropylene Composition (II) | 10 | 20 | 30 | 0 |
| MFR (dg/min) | 3.9 | 4.0 | 4.0 | 3.9 |
| Melt tension (cN) | 0.8 | 1.0 | 1.4 | 0.4 |
| Melting point (° C.) | 164 | 165 | 165 | 165 |
| Crystallization temperature (° C.) | 120 | 120 | 121 | 119 |
| Mw/Mn | 2.1 | 2.0 | 2.2 | 1.9 |
| [η] (dl/g) | 2.21 | 2.20 | 2.20 | 1.93 |

As seen from Table 1, the olefin (co)polymer obtained from the metallocene catalyst type of the examples of the present invention has a high melt tension.

Example 4

(1) Production of Olefin (co)polymer (I) (Propylene Polymerization)
[Preparation of a Supported Catalyst]

In a 500 ml flask sufficiently dried and supplied with $N_2$, 0.52 g (0.9 mmols) of dimethylsilylene bis(2-methyl,4,5-benzoindenyl)zirconium dichloride, 267 mmol (per mol of Al atom) of methylaluminoxane diluted with toluene were introduced, and allowed to react for 10 min. Thereafter, 10 g of silica (Grace Davison) that had been baked at 800° C. for 8 hours was added, and the mixture was stirred for 10 min. Then, a slight flow of $N_2$ was supplied from the bottom of the container while applying a vacuum from the top. The mixture was heated at 70° C. for 9 hours while evaporating the solvent. A dried solid was cooled at room temperature over night. The thus obtained solid catalyst and 250 ml of isopentane were supplied to a 500 ml flask sufficiently dried and supplied with $N_2$, and cooled to 0° C. Thereafter, ethylene was continuously added at a flow rate of 80 ml/min for 4 hours so as to effect polymerization. Then, a surpernatant was decanted, and decantation and washing with 100 ml of isopentane were further repeated four times. Furthermore, drying under vacuum was performed at room temperature for two hours so as to prepare 35 g of the supported catalyst.
[Propylene Polymerization]

The air in a stainless steel polymerization reactor provided with an inclined turbine agitator having an inner volume of 100 $dm^3$ was replaced with a nitrogen gas. Then, 33 $dm^3$ of n-hexane and 17 mmols of triethylaluminum were supplied and the mixture was stirred for 5 min. Thereafter, the thus prepared supported catalyst was added in an amount of 3.6 g while maintaining the temperature in the reactor at 50° C., and immediately after that, propylene monomer was supplied to the reactor continuously for two hours while maintaining the pressure in the gas phase portion in the polymerization reactor at 1.1 MPa, so as to polymerize propylene at 50° C. The weight of the obtained powder was 2.6 kg. The analysis of the obtained powder revealed that the MFR was 4.0 g/10 min and the intrinsic viscosity was 1.88 dl/g.

(2) Production of Polypropylene Composition (II)

A polypropylene composition (II) was produced in the same manner as in Example 1.

(3) Blend of Olefin (co)polymers (I) and Composition (II)

Ninety parts by weight of the olefin (co)polymer (I) and 10 parts by weight of the polypropylene composition (II), 0.1 parts by weight of 2,6-di-t-butyl-p-cresol and 0.1 parts by weight of calcium stearate were mixed, and pellets were produced from the mixture by an extruder with a screw having a diameter of 40 mm at 230° C. When various properties of the pellets were evaluated, the results were such that the MFR was 4.0 dg/min and the melt tension (MS) was 0.8 cN. The molecular weight distribution (Mw/Mn) obtained by gel permeation chromatography was 2.0. The properties are shown in Table 2.

Example 5

Eighty parts by weight of the olefin (co)polymer (I) and 20 parts by weight of the polypropylene composition (II) produced in Example 4, 0.1 parts by weight of 2,6-di-t-butyl-p-cresol and 0.1 parts by weight of calcium stearate were mixed, and pellets were produced from the mixture by an extruder with a screw having a diameter of 40 mm at 230° C. When various properties of the pellets were evaluated, the results were such that the MFR was 4.1 dg/min and the melt tension (MS) was 1.1 cN. The molecular weight distribution (Mw/Mn) obtained by gel permeation chromatography was 2.1. The properties are shown in Table 2.

Example 6

Seventy parts by weight of the olefin (co)polymer (I) and 30 parts by weight of the polypropylene composition (II) produced in Example 4, 0.1 parts by weight of 2,6-di-t-butyl-p-cresol and 0.1 parts by weight of calcium stearate were mixed, and pellets were produced from the mixture by an extruder with a screw having a diameter of 40 mm at 230° C. When various properties of the pellets were evaluated, the results were such that the MFR was 4.0 dg/min and the melt tension (MS) was 1.4 cN. The molecular weight distribution (Mw/Mn) obtained by gel permeation chromatography was 2.1. The properties are shown in Table 2.

Comparative Example 2

A hundred parts by weight of the olefin (co)polymer (I) produced in Example 4, 0.1 parts by weight of 2,6-di-t-butyl-p-cresol and 0.1 parts by weight of calcium stearate were mixed, and pellets were produced from the mixture by an extruder with a screw having a diameter of 40 mm at 230° C. When various properties of the pellets were evaluated, the results were such that the MFR was 4.0 dg/min and the melt tension (MS) was 0.4 cN. The molecular weight distribution (Mw/Mn) obtained by gel permeation chromatography was 1.9. The properties are shown in Table 2.

TABLE 2

|  | Ex. 4 | Ex. 5 | Ex. 6 | Com. Ex. 2 |
|---|---|---|---|---|
| Olefin (co) polymer (I) | 90 | 80 | 70 | 100 |
| Polypropylene Composition (II) | 10 | 20 | 30 | 0 |
| MFR (dg/min) | 4.0 | 4.1 | 4.0 | 4.0 |
| Melt tension (cN) | 0.8 | 1.1 | 1.4 | 0.4 |
| Mw/Mn | 2.0 | 2.0 | 2.1 | 1.9 |

As seen from Table 2, the olefin (co)polymer obtained from the metallocene catalyst type of the examples of the present invention has a high melt tension.

Example 7

(1) Production of Olefin (co)polymer (I) Propylene Polymerization)
[Preparation of a Supported Catalyst]
In a 500 ml flask sufficiently dried and supplied with $N_2$, 0.57 g (0.9 mmols) of dimethylsilylene bis(2-methyl,4,phenyl-indenyl)zirconium dichloride, 267 mmols (per mol of Al atom) of methylaluminoxane diluted with toluene were added, and allowed to react for 10 min. Thereafter, 10 g of silica (Grace Davison) that had been baked at 800° C. for 8 hours was added, and the mixture was stirred for 10 min. Then, a slight flow of $N_2$ was supplied from the bottom of the container while applying a vacuum from the top. The mixture was heated at 70° C. for 9 hours while evaporating the solvent. A dried solid was cooled at room temperature over night. The thus obtained solid catalyst and 250 ml of isopentane were supplied to a 500 ml flask sufficiently dried and supplied with $N_2$, and cooled to 0° C. Thereafter, ethylene was continuously added at a flow rate of 80 ml/min for 4 hours so as to effect polymerization. Then, a supernatant was decanted, and decantation and washing with 100 ml of isopentane were further repeated four times. Furthermore, drying under vacuum was performed at room temperature for two hours so as to prepare 37 g of the supported catalyst.
[Propylene Polymerization]
The air in a stainless steel polymerization reactor provided with an inclined turbine agitator having an inner volume of 100 dm$^3$ was replaced with a nitrogen gas. Then, 50 dm$^3$ of n-hexane and 100 mmols of triethylaluminum were supplied and the mixture was stirred for 5 min. Thereafter, the thus prepared supported catalyst was added in an amount of 3.8 g while maintaining the temperature in the reactor at 70° C., and immediately after that, propylene monomer was supplied to the reactor continuously for two hours while maintaining the pressure in the gas phase portion in the polymerization reactor at 1.1 MPa, so as to polymerize the propylene at 70° C. The weight of the obtained powder was 7.4 kg. The analysis of the obtained powder revealed that the MFR was 4.1 g/10 min and the intrinsic viscosity was 1.78 dl/g.
(2) Production of Polypropylene Composition (II)
A polypropylene composition (II) was produced in the same manner as in Example 1.
(3) Blend of Olefin (co)polymers (I) and Composition (II)
Ninety parts by weight of the thus produced olefin (co)polymer (I) and 10 parts by weight of the thus produced polypropylene composition (II), 0.1 parts by weight of 2,6-di-t-butyl-p-cresol and 0.1 parts by weight of calcium stearate were mixed, and pellets were produced from the mixture by an extruder with a screw having a diameter of 40 mm at 230° C. When various properties of the pellets were evaluated, the results were such that the MFR was 3.9 dg/min and the melt tension (MS) was 0.9 cN. The molecular weight distribution (Mw/Mn) obtained by gel permeation chromatography was 2.0. The other properties are shown in Table 3.

Example 8

Eighty parts by weight of the olefin (co)polymer (I) and 20 parts by weight of the polypropylene composition (aI) produced in Example 7, 0.1 parts by weight of 2,6-di-t-butyl-p-cresol and 0.1 parts by weight of calcium stearate were mixed, and pellets were produced from the mixture by an extruder with a screw having a diameter of 40 mm at 230° C. When various properties of the pellets were evaluated, the results were such that the MFR was 4.0 dg/min and the melt tension (MS) was 1.0 cN. The molecular weight distribution (Mw/Mn) obtained by gel permeation chromatography was 2.0. The properties are shown in Table 3.

Example 9

Seventy parts by weight of the olefin (co)polymer (I) and 30 parts by weight of polypropylene composition (II) produced in Example 7, 0.1 parts by weight of 2,6-di-t-butyl-p-cresol and 0.1 parts by weight of calcium stearate were mixed, and pellets were produced from the mixture by an extruder with a screw having a diameter of 40 mm at 230° C. When various properties of the pellets were evaluated, the results were such that the MFR was 4.0 dg/min and the melt tension (MS) was 1.5 cN. The molecular weight distribution (Mw/Mn) obtained 10 by gel permeation chromatography was 2.0. The properties are shown in Table 3.

Comparative Example 3

A hundred parts by weight of the olefin (co)polymer (I) produced in Example 7, 0.1 parts by weight of 2,6-di-t-butyl-p-cresol and 0.1 parts by weight of calcium stearate were mixed, and pellets were produced from the mixture by an extruder with a screw having a diameter of 40 mm at 230° C. When various properties of the pellets were evaluated, the results were such that the MFR was 4.1 dg/min and the melt tension (S) was 0.4 cN. The molecular weight distribution (Mw/Mn) obtained by gel permeation chromatography was 2.0. The properties are shown in Table 3.

TABLE 3

|  | Ex. 7 | Ex. 8 | Ex. 9 | Com. Ex. 3 |
| --- | --- | --- | --- | --- |
| Olefin (co) polymer (I) | 90 | 80 | 70 | 100 |
| Polypropylene Composition (II) | 10 | 20 | 30 | 0 |
| MFR (dg/min) | 3.9 | 4.0 | 4.0 | 4.1 |
| Melt tension (cN) | 0.9 | 1.0 | 1.5 | 0.4 |
| Mw/Mn | 2.0 | 2.0 | 2.0 | 2.0 |

As seen from Table 3, the olefin (co)polymer obtained from the metallocene catalyst type of the examples of the present invention has a high melt tension.

As described above, the olefin (co)polymer obtained from the metallocene catalyst type of the present invention has a high melt tension and an excellent formability.

The invention may be embodied in other forms without departing from the spirit or essential characteristics thereof. The embodiments disclosed in this application are to be considered in all respects as illustrative and not limitative, the scope of the invention is indicated by the appended claims rather than by the foregoing description, and all changes which come within the meaning and range of equivalency of the claims are intended to be embraced therein.

What is claimed is:

1. An olefin (co)polymer composition comprising 99 to 50% by weight of crystalline propylene (co)polymer (I) and 1 to 50% by weight of olefin composition (II), the weight percent of (I) and (II) being expressed as a percent of a total weight of the composition, the crystalline propylene (co)polymer (I) having an intrinsic viscosity $\eta_I$ measured in tetrahydronaphthalene at 135° C. of 0.2 to 10 dl/g, and being obtained by (co)polymerizing olefin with a catalyst comprising the following compounds (A) and (B), or (A), (B) and (C):

compound (A): a metallocene transition metal compound having two π-electron conjugated ligands, compound (B): one or more compounds selected from the group consisting of (B-1) aluminoxane, (B-2) an ionic compound that forms an ionic complex by a reaction with the transition metal compound (A), and (B-3) a Lewis acid, and compound (C): an organic aluminum compound, the olefin composition (II) comprising 0.01 to 5 parts by weight of the following component (II-1) and 100 parts by weight of the following component (II-2);

(II-1): an ethylene (co)polymer having a calculated viscosity $\eta_E$ of 15 to 100 dl/g; and (II-2): a crystalline propylene (co)polymer having a calculated viscosity $\eta_I$ of 0.2 to 10 dl/g.

2. The composition according to claim 1, wherein, in the case where the transition metal compound expressed by general formula 1 comprises two or more π-electron conjugated ligands, the two π-electron conjugated ligands are linked through at least one group selected from the group consisting of an alkylene group, a substituted alkylene group, a cycloalkylene group, a substituted cycloalkylene group, a substituted alkylidene group, a phenylene group, a silylene group, a dimethylsilylene group, a diphenylsilylene group, a dialkylsilylene group, a substituted dimethylsilylene group and an Me$_2$Ge group.

3. The composition according to claim 1, wherein the ethylene (co)polymer (II-1) is an ethylene homopolymer or an ethylene-olefin copolymer comprising at least 50 wt % ethylene polymerization units.

4. The composition according to claim 1, wherein the propylene (co)polymer (I) is a propylene homopolymer or a propylene-olefin random copolymer or a propylene-olefin block copolymer comprising at least 50 wt % propylene polymerization units.

5. The composition according to claim 1, wherein the propylene (co)polymer (II-2) is a propylene homopolymer or a propylene-olefin random copolymer or a propylene-olefin block copolymer comprising at least 50 wt % propylene polymerization units.

6. The composition according to claim 1, wherein the propylene (co)polymer composition has a melt tension (MS) at 230° C. and a melt flow rate (MFR) measured under a load of 21.18N at 230° C. that satisfy the following inequality:

$$\log(MS) > -1.28 \times \log(MFR) + 0.44.$$

7. The composition according to claim 1, wherein the compound (A) is a transition metal compound expressed by general formula 1:

$$ML_4 \qquad \text{(general formula 1)}$$

where M is a transition metal selected from the group consisting of Zr, Ti, and Hf, L, is a ligand coordinated with the transition metal, and two Ls are π-electron conjugated ligands.

8. The composition according to claim 7, wherein the π-electron conjugated ligand is a ligand having a η-cyclopentadienyl structure.

9. The composition according to claim 8, wherein the ligand having a η-cyclopentadienyl structure is at least one ligand selected from the group consisting of a cyclopentadienyl group, an indenyl group, a hydrogenated indenyl group and a fluorenyl group, these groups optionally being, substituted with at least one group selected from the group consisting of an alkyl group, an aryl group and an aralkyl group, a trialkylsilyl group, a halogen atom, an alkoxy gruop, an aryloxy group, a chain alkylene group, and a cyclic alkylene group.

10. The composition according to claim 7, wherein L other than the π-electron conjugated ligand is at least one selected from the group consisting of a halogen, an alkyl group, a cycloalkyl group, an aryl group, an aralkyl group, a silicon-substituted hydrocarbon group, an alkoxy group, an aryloxy group and, a substituted sulfonato group.

11. The olefin (co)polymer composition according to claim 1, which is produced by blending the olefin (co) polymer (I) and composition (II) of claim 1, by using mechanically mixing equipment.

12. The olefin (co)polymer composition according to claim 11, wherein the mechanically mixing equipment is at least one apparatus selected from the group consisting of an extruder and a kneader.

* * * * *